US010614739B2

(12) United States Patent
Takahashi

(10) Patent No.: US 10,614,739 B2
(45) Date of Patent: Apr. 7, 2020

(54) DISPLAY DEVICE, DISPLAY MODULE, AND ELECTRONIC DEVICE

(71) Applicant: Semiconductor Energy Laboratory Co., Ltd., Atusgi-shi, Kanagawa-ken (JP)

(72) Inventor: Kei Takahashi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/615,994

(22) Filed: Jun. 7, 2017

(65) Prior Publication Data
US 2017/0365203 A1    Dec. 21, 2017

(30) Foreign Application Priority Data

Jun. 15, 2016  (JP) ................................. 2016-119200

(51) Int. Cl.
*G09G 3/20* (2006.01)
*G09G 3/3291* (2016.01)
(Continued)

(52) U.S. Cl.
CPC ........... *G09G 3/2011* (2013.01); *G06F 3/041* (2013.01); *G09G 3/3208* (2013.01);
(Continued)

(58) Field of Classification Search
CPC ........................... G09G 3/3406; G09G 3/3607
See application file for complete search history.

(56) References Cited

U.S. PATENT DOCUMENTS 6,317,109 B1    11/2001   Lee
6,714,268 B2    3/2004    Wang et al.
(Continued)

FOREIGN PATENT DOCUMENTS

JP    2001-066593 A    3/2001
JP    2002-196702 A    7/2002
(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.
(Continued)

*Primary Examiner* — Stephen G Sherman
*Assistant Examiner* — Chayce R Bibbee
(74) *Attorney, Agent, or Firm* — Fish & Richardson P.C.

(57) ABSTRACT

To provide a display device in which a reflective liquid crystal element and a light-emitting element are switched for display, and the operation of a reflective liquid crystal element driver IC and the operation of a light-emitting element driver IC can be alternately stopped even when they are integrated. The display device includes a pixel, a driver circuit, and a switching control circuit. The driver IC includes a buffer amplifier for outputting a grayscale voltage to drive the liquid crystal element and a buffer amplifier for outputting a grayscale voltage to drive the light-emitting element. Each buffer amplifier includes a transistor configured to supply a bias current, and a switch. The switch is configured to control a conduction state between a wiring for supplying a bias voltage and a gate of the transistor. The switching control circuit is configured to output a switching signal for controlling a conduction state of the switch.

19 Claims, 13 Drawing Sheets

(51) Int. Cl.
*G09G 3/36* (2006.01)
*G06F 3/041* (2006.01)
*G09G 3/3208* (2016.01)
*G02F 1/133* (2006.01)
*G02F 1/1335* (2006.01)

(52) U.S. Cl.
CPC ......... *G09G 3/3291* (2013.01); *G09G 3/3607* (2013.01); *G09G 3/3685* (2013.01); *G02F 1/13318* (2013.01); *G02F 1/133553* (2013.01); *G02F 2201/44* (2013.01); *G09G 2300/046* (2013.01); *G09G 2300/0452* (2013.01); *G09G 2300/0465* (2013.01); *G09G 2310/0289* (2013.01); *G09G 2310/0291* (2013.01)

(56) References Cited

U.S. PATENT DOCUMENTS

| | | | |
|---|---|---|---|
| 7,038,641 B2 | 5/2006 | Hirota et al. | |
| 7,084,936 B2 | 8/2006 | Kato | |
| 7,102,704 B2 | 9/2006 | Mitsui et al. | |
| 7,176,991 B2 | 2/2007 | Mitsui et al. | |
| 7,239,361 B2 | 7/2007 | Kato | |
| 7,248,235 B2 | 7/2007 | Fujii et al. | |
| 7,385,654 B2 | 6/2008 | Mitsui et al. | |
| 2002/0145687 A1* | 10/2002 | Mitsui | G02F 1/133603 349/113 |
| 2003/0201960 A1 | 10/2003 | Fujieda | |
| 2004/0140972 A1* | 7/2004 | Hirota | G02B 6/0055 345/204 |
| 2006/0072047 A1* | 4/2006 | Sekiguchi | G02F 1/1335 349/25 |
| 2008/0088616 A1* | 4/2008 | Inokuchi | H03F 3/3001 345/212 |
| 2008/0180618 A1 | 7/2008 | Fujieda | |
| 2009/0009505 A1* | 1/2009 | Koyama | G09G 3/20 345/212 |
| 2009/0146913 A1* | 6/2009 | Tanabe | G02F 1/13624 345/3.1 |
| 2010/0171905 A1 | 7/2010 | Huang et al. | |
| 2012/0038618 A1 | 2/2012 | Koyama | |

FOREIGN PATENT DOCUMENTS

| | | |
|---|---|---|
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-232882 A | 9/2007 |
| JP | 2008-225381 A | 9/2008 |
| JP | 4161574 B2 | 10/2008 |
| JP | 2013-221965 A | 10/2013 |
| WO | WO-2004-053819 A | 6/2004 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.

Kusunoki.K et al.. "Transmissive OLED and Reflective LC Hybrid (TR-Hybrid) Display", SID Digest '16 : SID International Symposium Digest of Technical Papers, May 22, 2016, vol. 47, pp. 57-60.

Sakuishi.T et al., "Transmissive OLED and Reflective LC Hybrid (TR-Hybrid) Display with High Visibility and Low Power Consumption", SID Digest '16 : SID International Symposium Digest of Technical Papers, May 22, 2016, vol. 47, pp. 735-738.

Ohide.T et al.. "Application of Transfer Technology to Manufacturing of Transmissive OLED and Reflective LC Hybrid (TR-Hybrid) Display", SID Digest '16 : SID International Symposium Digest of Technical Papers, May 22, 2016, vol. 47, pp. 1002-1004.

* cited by examiner

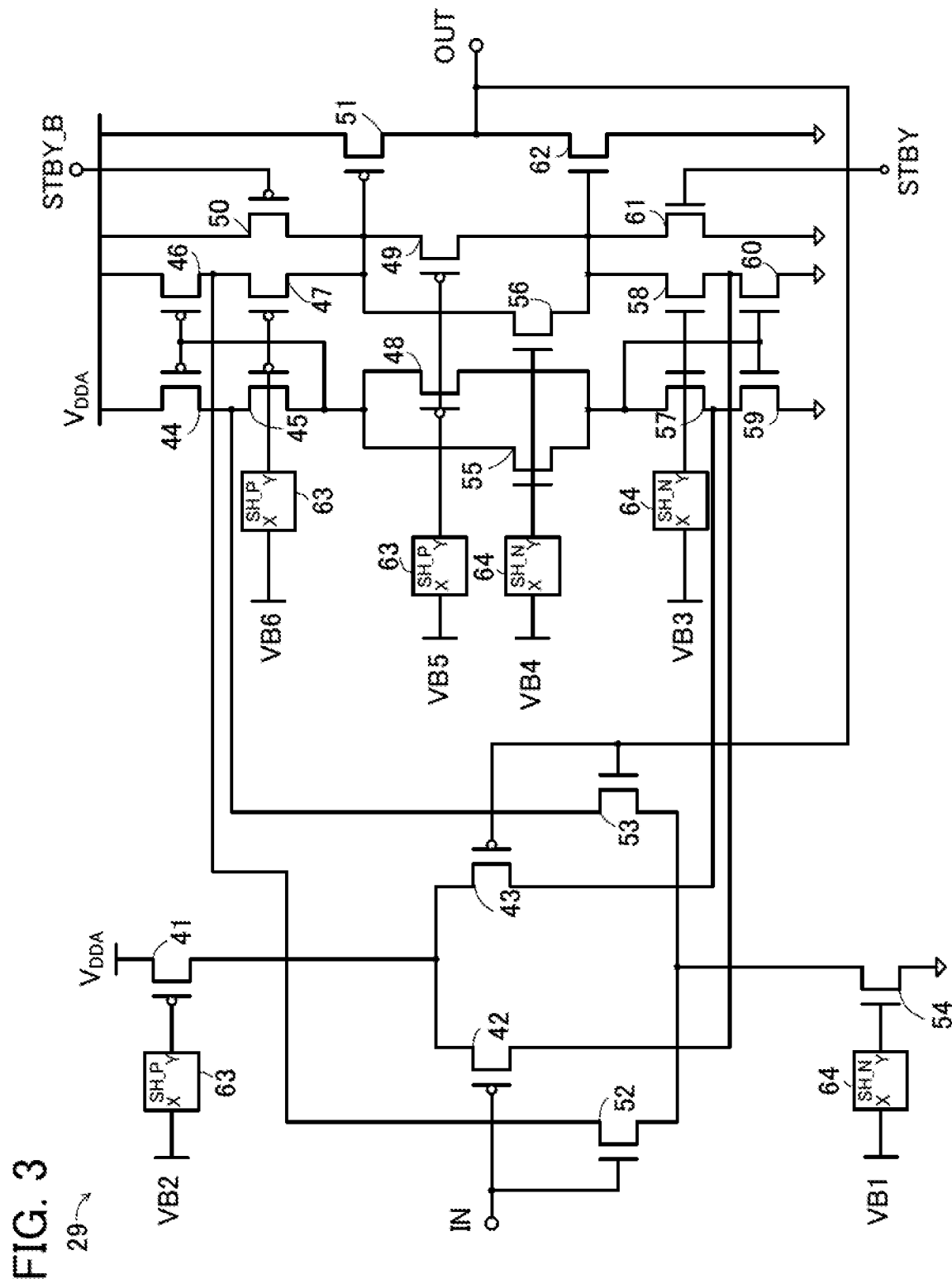

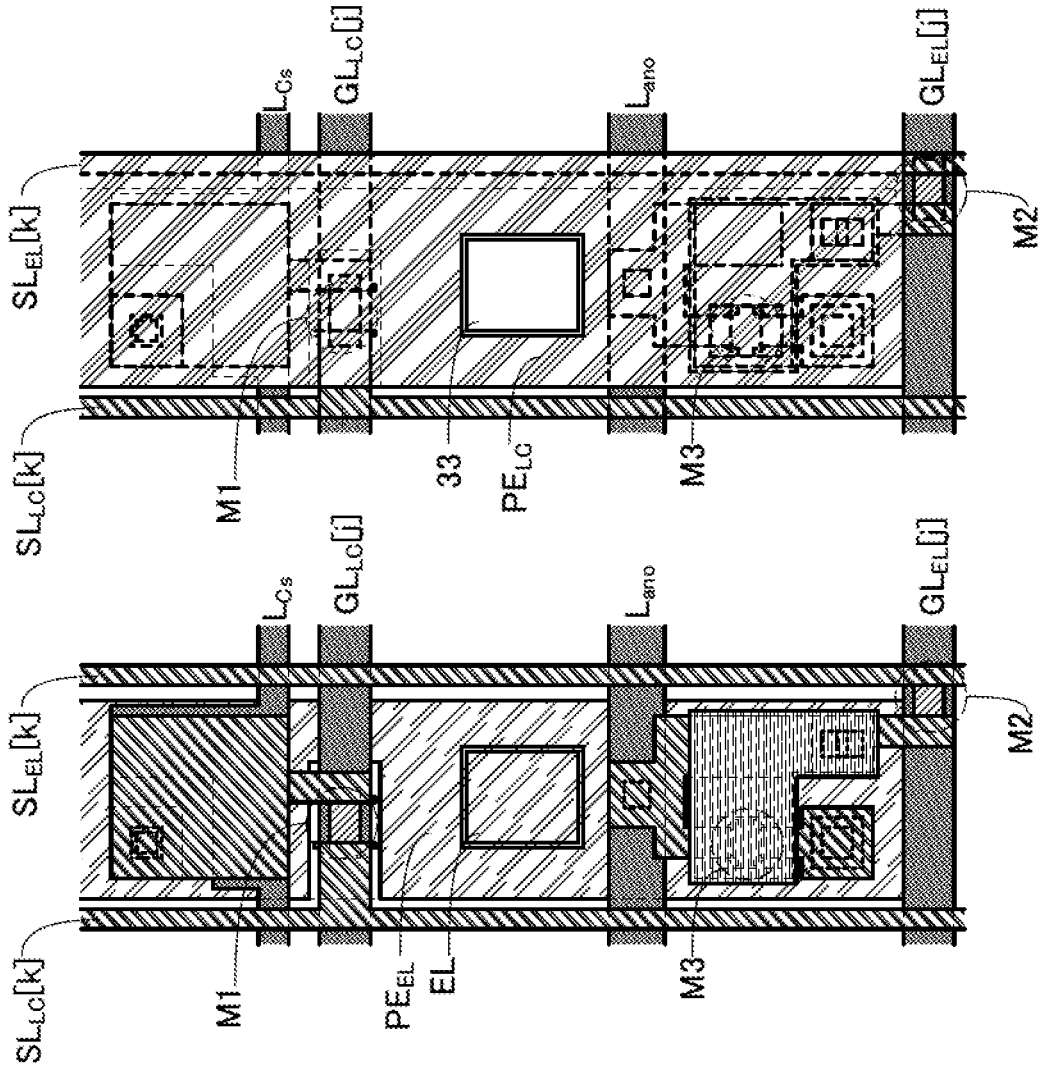

DISPLAY DEVICE, DISPLAY MODULE, AND ELECTRONIC DEVICE

TECHNICAL FIELD

One embodiment of the present invention relates to a display device, a display module, and an electronic device.

BACKGROUND ART

A display device including a reflective liquid crystal element combined with a light-emitting element using electroluminescence (EL) has been proposed (see Patent Document 1).

In the structure disclosed in Patent Document 1, a display element determination portion determines that one of a reflective liquid crystal element driver integrated circuit (IC) and a light-emitting element driver IC operates whereas the other stops operating.

REFERENCE

Patent Document

[Patent Document 1] Japanese Published Patent Application No. 2008-225381

DISCLOSURE OF INVENTION

In the structure in Patent Document 1, the reflective liquid crystal element driver IC and the light-emitting element driver IC alternately stop operating. However, it is difficult to alternately stop the operation of the reflective liquid crystal element driver IC and the light-emitting element driver IC when they are integrally formed.

Furthermore, in the case where the reflective liquid crystal element and the light-emitting element are switched frequently, the switching operation needs to be performed in as short a time as possible to improve display quality and convenience.

An object of one embodiment of the present invention is to provide a display device in which a reflective liquid crystal element and a light-emitting element are switched for display, and the operation of a reflective liquid crystal element driver IC and the operation of a light-emitting element driver IC can be alternately stopped even when they are integrally formed.

Another object of one embodiment of the present invention is to provide a display device with power consumption reduced in accordance with a change in usage environment. Another object of one embodiment of the present invention is to provide a display device with visibility increased in accordance with a change in usage environment. Another object of one embodiment of the present invention is to provide a display device with improved convenience.

The description of these objects does not preclude the existence of other objects. One embodiment of the present invention does not necessarily achieve all the objects. Other objects are apparent from and can be derived from the description of the specification, the drawings, the claims, and the like.

One embodiment of the present invention is a display device including a pixel, a driver circuit, and a switching control circuit. The pixel includes a liquid crystal element, a first pixel circuit for driving the liquid crystal element, a light-emitting element, and a second pixel circuit for driving the light-emitting element. The liquid crystal element includes a reflective electrode having an opening and is configured to display a grayscale image by reflecting external light. The light-emitting element is configured to display a grayscale image by emitting light through the opening. The driver circuit includes a first buffer amplifier for outputting a grayscale voltage to the liquid crystal element and a second buffer amplifier for outputting a grayscale voltage to the light-emitting element. The first buffer amplifier and the second buffer amplifier each include a first transistor configured to supply a bias current, and a switch. The switch is configured to control a conduction state between a wiring for supplying a bias voltage and a gate of the first transistor. The switching control circuit is configured to output a switching signal for controlling a conduction state of the switch.

The display device of one embodiment of the present invention preferably includes a controller and a sensor. The sensor is configured to measure illuminance. The controller is configured to switch a first mode for displaying a grayscale image with the liquid crystal element, a second mode for displaying a grayscale image with the liquid crystal element and the light-emitting element, and a third mode for displaying a grayscale image with the light-emitting element.

In the display device of one embodiment of the present invention, each of the first pixel circuit and the second pixel circuit preferably includes a second transistor that includes an oxide semiconductor in a semiconductor layer where a channel formation region is formed.

In the display device of one embodiment of the present invention, the switching signal preferably includes a first switching signal to be supplied to the first buffer amplifier and a second switching signal to be supplied to the second buffer amplifier.

Note that other embodiments of the present invention will be shown in the following embodiments and the drawings.

According to one embodiment of the present invention, it is possible to provide a display device in which a reflective liquid crystal element and a light-emitting element are switched for display, and the operation of a reflective liquid crystal element driver IC and the operation of a light-emitting element driver IC can be alternately stopped even when they are integrally formed.

According to one embodiment of the present invention, it is possible to provide a display device with power consumption reduced in accordance with a change in usage environment. According to another embodiment of the present invention, it is possible to provide a display device with visibility increased in accordance with a change in usage environment. According to another embodiment of the present invention, it is possible to provide a display device with improved convenience.

BRIEF DESCRIPTION OF DRAWINGS

In the accompanying drawings:

FIG. 3 is a circuit diagram illustrating a structure example of a display device;

FIGS. 8A to 8C are a circuit diagram and layout illustrating structure examples of a display device;

BEST MODE FOR CARRYING OUT THE INVENTION

Hereinafter, embodiments will be described with reference to the drawings. Note that the embodiments can be implemented with various modes, and it will be readily appreciated by those skilled in the art that modes and details can be changed in various ways without departing from the spirit and scope of the present invention. Thus, the present invention should not be interpreted as being limited to the following description of the embodiments.

<Structure Example of Display Device>

A structure example of a display device will be described with reference to FIG. 1 and FIG. 2.

Figure 1:
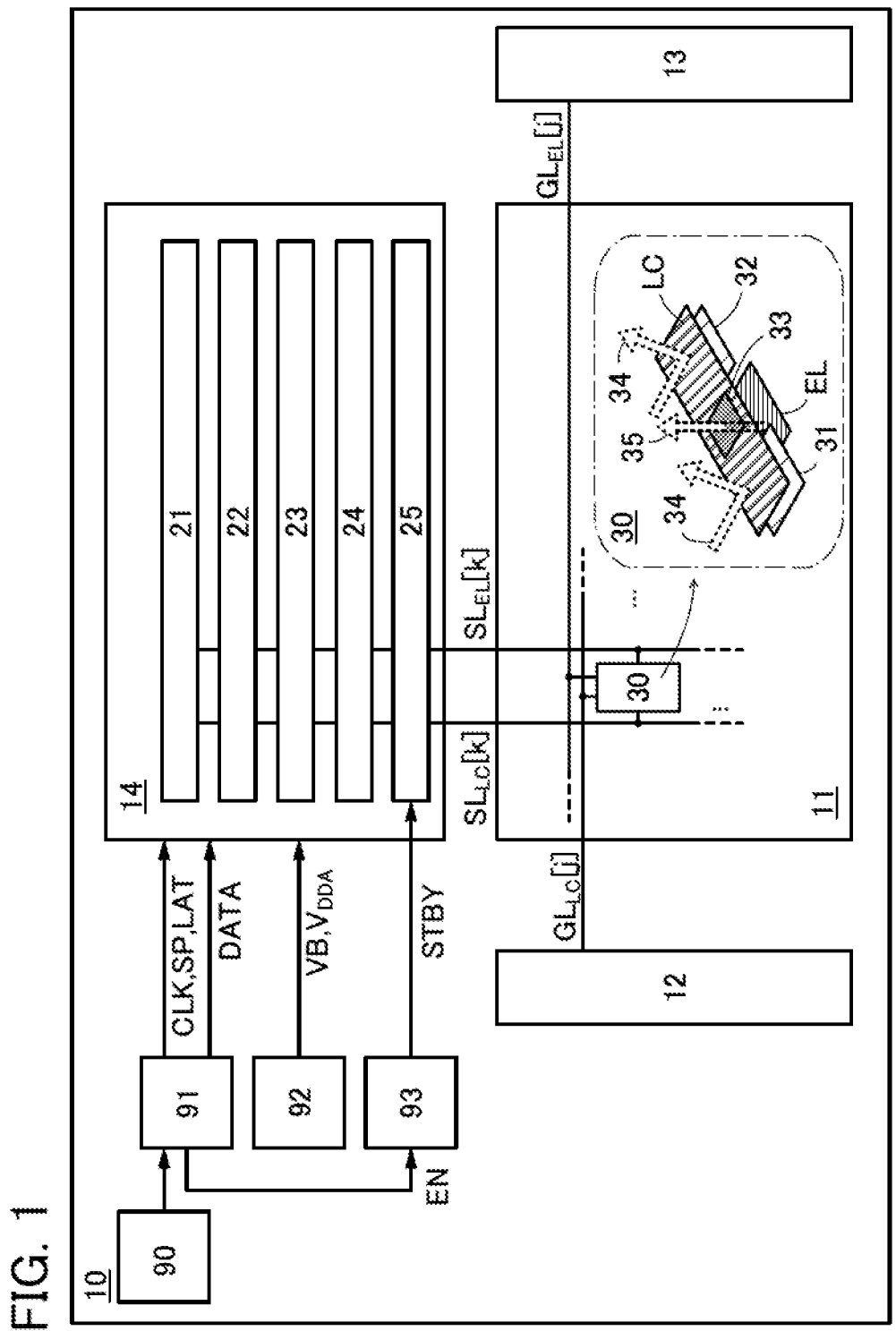
FIG. 1 is a block diagram illustrating a structure example of a display device.

FIG. 1 shows an example of a block diagram of a pixel portion and peripheral circuits in a display device. A display device 10 illustrated in FIG. 1 includes a pixel portion 11, a driver circuit 12, a driver circuit 13, a driver circuit 14, a sensor 90, a controller 91, a power source circuit 92, and a switching control circuit 93.

The pixel portion 11 includes a plurality of pixels, for example, pixels arranged in m rows and n columns (each of m and n is a natural number). In FIG. 1, a pixel 30 in a j-th row and a k-th column (j is a natural number less than or equal to m, and k is a natural number less than or equal to n) is shown as a pixel in an arbitrary row and an arbitrary column.

The structure of the pixel 30 will be described.

FIG. 1 shows a schematic diagram of the pixel 30. The pixel 30 includes a pixel circuit 31, a pixel circuit 32, a liquid crystal element LC, and a light-emitting element EL. The pixel circuit 31 controls the grayscale display of the liquid crystal element LC, whereas the pixel circuit 32 controls the grayscale display of the light-emitting element EL. Note that the liquid crystal element LC includes a reflective electrode. In the liquid crystal element LC, the intensity of light reflected on the reflective electrode is adjusted by a liquid crystal layer to perform grayscale display. In the light-emitting element EL, light emission is adjusted by changing the amount of current flowing between electrodes to perform grayscale display. Note that details of the cross-sectional structure and the like of the pixel will be described later.

The schematic diagram of the pixel 30 in FIG. 1 illustrates the arrangement of the pixel circuit 31, the pixel circuit 32, the liquid crystal element LC, and the light-emitting element EL. The liquid crystal element LC illustrated in FIG. 1 includes an opening 33. This opening 33 is provided in the reflective electrode. The light-emitting element EL illustrated in FIG. 1 is provided to overlap with the opening 33 of the liquid crystal element LC.

The pixel circuit 31 and the pixel circuit 32 illustrated in FIG. 1 are provided between a layer including the liquid crystal element LC and a layer including the light-emitting element EL. An element layer including transistors in the pixel circuit 31 for driving the liquid crystal element LC and an element layer including transistors in the pixel circuit 32 for driving the light-emitting element EL are formed in the same process, so that the pixel circuit 31 and the pixel circuit 32 are arranged in the same layer. This structure offers a driver circuit in which a driver circuit for supplying a grayscale voltage to the liquid crystal element LC is integrated with a driver circuit for supplying a grayscale voltage to the light-emitting element EL. Note that in FIG. 1, the pixel circuit 31 and the pixel circuit 32 are provided between the layer including the liquid crystal element LC and the layer including the light-emitting element EL; alternatively, the pixel circuits may be provided over or under the liquid crystal element LC and the light-emitting element EL.

In the pixel 30 with the structure illustrated in FIG. 1, grayscale display can be performed by the control of the intensity of reflected light 34 of the liquid crystal element LC and the control of the intensity of light 35 emitted from the light-emitting element EL through the opening 33. Note that the reflected light 34 and the light 35 emitted from the light-emitting element EL are emitted toward a display surface of the display device 10.

In the pixel 30 with the structure illustrated in FIG. 1, the circuits for driving the pixels, such as the pixel circuit 31 and the pixel circuit 32, can be arranged under the reflective electrode of the liquid crystal element LC. This prevents a decrease in aperture ratio due to the addition of the pixel circuit 32 for driving the light-emitting element EL.

Also in the pixel 30 with the structure illustrated in FIG. 1, the intensity of external light reflected on the reflective electrode of the liquid crystal element LC is adjusted by the liquid crystal layer to perform grayscale display. This results in improved visibility in outdoor environments of the display device 10 including the pixel 30 in FIG. 1.

Also in the pixel 30 with the structure illustrated in FIG. 1, the intensity of the light 35 emitted from the light-emitting element EL is adjusted to perform grayscale display. This results in improved visibility in indoor environments with a low external light intensity of the display device 10 including the pixel 30 in FIG. 1.

Note that the sensor 90 capable of measuring illuminance is provided in the display device 10, which performs display in outdoor environments by the control of the liquid crystal element LC and performs display in indoor environments by the control of the light-emitting element EL. In accordance with the illuminance obtained by the sensor, the controller 91 can switch signals for controlling the driver circuits 12, 13, and 14, the power source circuit 92, and the switching control circuit 93. Note that in the display device 10, at least one of the liquid crystal element LC and the light-emitting element EL may be controlled to perform grayscale display. Alternatively, both of the liquid crystal element LC and the light-emitting element EL can be controlled to perform grayscale display in the display device 10, in which case the visibility of the display device 10 can be improved as compared with the case where grayscale display is performed with one of the liquid crystal element LC and the light-emitting element EL.

Furthermore, in the structure illustrated in FIG. 1, each pixel includes the pixel circuit 31 for controlling the liquid crystal element LC and the pixel circuit 32 for controlling the light-emitting element EL. In other words, grayscale display with the liquid crystal element LC and grayscale display with the light-emitting element EL can be independently controlled in each pixel 30. In such a structure, the control with a backlight for concurrently emitting light in a plurality of pixels is not performed, but light emission of the light-emitting element EL can be controlled in each pixel (minimum unit) in accordance with an image to be displayed, whereby unnecessary light emission can be prevented. Hence, lower power consumption can be achieved in the display device 10 including the pixel 30 in FIG. 1.

The pixel 30 can be used not only as a pixel in a display device for monochrome display but also as a pixel in a display device for color display when a color filter is provided. In color display, the pixel 30 corresponds to a subpixel with any of three color elements of RGB (R, G, and B represent red, green, and blue, respectively). The number of subpixels in one pixel is not limited to three. For example, one pixel may include four subpixels: an R subpixel, a G subpixel, a B subpixel, and a W (white) subpixel. Alternatively, a color element may be composed of two colors among R, G, and B as in PenTile layout. The two colors may differ among color elements.

The above is the description of the structure of the pixel 30.

Next, the peripheral driver circuits of the pixel portion 11, such as the driver circuits 12, 13, and 14, the power source circuit 92, and the switching control circuit 93, will be described.

The driver circuit 12 is configured to transmit a scanning signal to a gate line $GL_{LC}[j]$. The scanning signal output from the driver circuit 12 is transmitted to the pixel 30 through the gate line $GL_{LC}[j]$. With the scanning signal supplied to the gate line $GL_{LC}[j]$, a grayscale voltage that has been supplied to a signal line $SL_{LC}[k]$ is written to the pixel 30. Note that the driver circuit 12 is composed of shift registers and the like to which various signals (e.g., clock signals and start pulse signals) are input to drive.

The driver circuit 13 is configured to transmit a scanning signal to a gate line $GL_{EL}[j]$. The scanning signal output from the driver circuit 13 is transmitted to the pixel 30 through the gate line $GL_{EL}[j]$. With the scanning signal supplied to the gate line $G_{EL}[j]$, a grayscale voltage that has been supplied to a signal line $SL_{EL}[k]$ is written to the pixel 30. Note that the driver circuit 13 is composed of shift registers and the like to which various signals (e.g., clock signals and start pulse signals) are input to drive.

The driver circuit 14 is configured to transmit a grayscale voltage for driving the liquid crystal element LC included in the pixel 30 to the signal line $SL_{LC}[k]$. Furthermore, the driver circuit 14 is configured to transmit a grayscale voltage for driving the light-emitting element EL included in the pixel 30 to the signal line $SL_{EL}[k]$. The grayscale voltage supplied to the signal line $SL_{LC}[k]$ is a voltage for driving the liquid crystal element LC included in the pixel 30. The grayscale voltage supplied to the signal line $SL_{EL}[k]$ is a voltage for driving the light-emitting element EL included in the pixel 30. Note that the driver circuit 14 is supplied with various signals (e.g., clock signals, start pulses, latch signals, image data, bias voltages, power source voltages, and switching signals) for driving.

The driver circuit 14 illustrated in FIG. 1 includes, for example, a shift register 21, a latch 22, a level shifter 23, a digital/analog (D/A) converter 24, and a buffer amplifier 25, from which a grayscale voltage is output to the signal line $SL_{LC}[k]$ and the signal line $SL_{EL}[k]$ in each column.

A clock signal CLK and a start pulse SP are input to the shift register 21, and a pulse signal is generated therein. In the latch 22, image data DATA as a digital signal is stored in accordance with the pulse signal input thereto, and the stored image signal is output in accordance with a latch signal LAT. The image data is input to the level shifter 23 in accordance with the latch signal LAT, and the voltage of the digital signal is amplified. In the D/A converter 24, the image data as digital data is converted into a grayscale voltage of analog data.

The buffer amplifier 25 includes a buffer amplifier for outputting a grayscale voltage to the signal line $SL_{LC}[k]$ and a buffer amplifier for outputting a grayscale voltage to the signal line $SL_{EL}[k]$. A plurality of bias voltages VB and a voltage $V_{DDA}$ are input to each buffer amplifier, and a desired voltage is output by controlling a bias current flowing through an operational amplifier functioning as a voltage follower. In addition, a plurality of switching signals STBY are input to the buffer amplifier 25 to control switching between the stop and restart of the bias current flowing through the operational amplifier functioning as a voltage follower.

The sensor 90 is configured to measure the illuminance of the periphery of the pixel portion 11. The controller 91 is configured to, in accordance with the illuminance obtained by the sensor 90, switch the restart and stop of the clock signal CLK, the start pulse SP, the latch signal LAT, and the like for controlling the operation of the driver circuits 12, 13, and 14. The power source circuit 92 is configured to generate a voltage such as the bias voltage VB and the voltage $V_{DDA}$ and output the voltage to each circuit. The switching control circuit 93 is configured to control the switching signal STBY in accordance with a control signal EN output from the controller 91. The switching signal STBY switches the stop and restart of a bias current flowing through a buffer amplifier that does not contribute to display.

Figure 2:
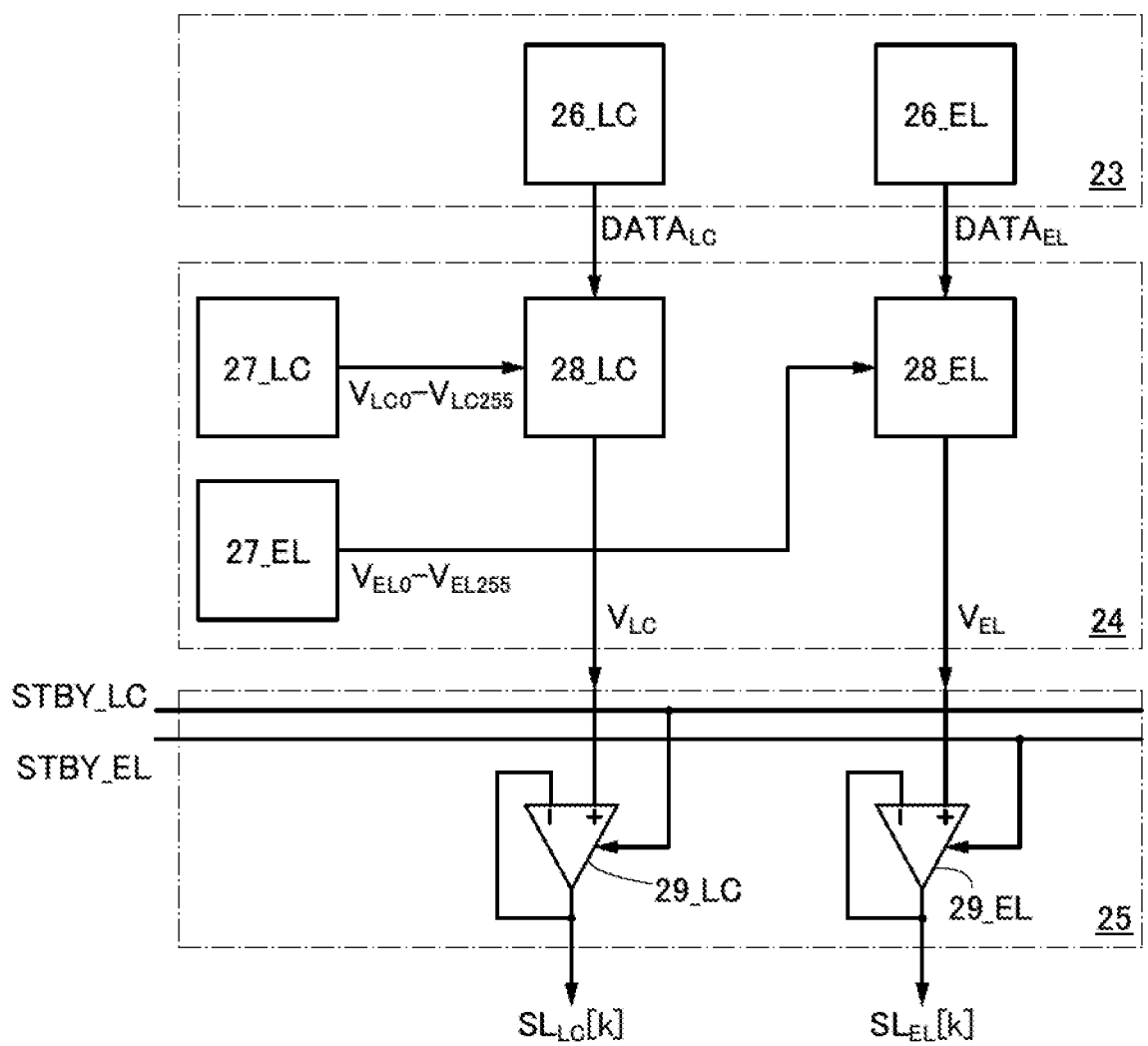
FIG. 2 is a block diagram illustrating a structure example of a display device.

In a block diagram of FIG. 2, the level shifter 23, the D/A converter 24, and the buffer amplifier 25 are illustrated more specifically than in FIG. 1.

The level shifter 23 illustrated in FIG. 2 includes a level shifter 26 LC and a level shifter 26_EL. The level shifter 26_LC outputs image data $DATA_{LC}$, which is a digital signal outputting a grayscale voltage for driving the liquid crystal element LC, to the signal line $SL_{LC}[k]$. The level shifter 26_EL outputs image data $DATA_{EL}$, which is a digital signal outputting a grayscale voltage for driving the light-emitting element EL, to the signal line $SL_{EL}[k]$.

The D/A converter 24 illustrated in FIG. 2 includes a voltage generation circuit 27_LC, a voltage generation circuit 27_EL, a pass transistor logic 28_LC, and a pass transistor logic 28_EL. The voltage generation circuit 27_LC generates a plurality of voltages (e.g., $V_{LC0}$ to $V_{LC255}$ in the case of 256 levels) that are to be grayscale voltages for driving the liquid crystal element LC. The pass transistor logic 28_LC selects, from the plurality of voltages generated in the voltage generation circuit 27_LC, a voltage to be a grayscale voltage on the basis of the image data as digital data. The voltage generation circuit 27_EL generates a plurality of voltages (e.g., $V_{EL0}$ to $V_{EL255}$ in the case of 256 levels) that are to be grayscale voltages for driving the light-emitting element EL. The pass transistor logic 28_EL selects, from the plurality of voltages generated in the voltage generation circuit 27_EL, a voltage to be a grayscale voltage on the basis of the image data as digital data.

The buffer amplifier 25 illustrated in FIG. 2 includes a buffer amplifier 29_LC and a buffer amplifier 29_EL. The buffer amplifier 29_LC can be composed of an operational amplifier functioning as a voltage follower and outputs a grayscale voltage for driving the liquid crystal element LC to the signal line $SL_{LC}[k]$. The buffer amplifier 29_EL can be composed of an operational amplifier functioning as a voltage follower and outputs a grayscale voltage for driving the light-emitting element EL to the signal line $SL_{EL}[k]$.

In the structure of FIG. 2, a plurality of bias voltages are supplied to the buffer amplifier 29_LC and the buffer amplifier 29_EL and bias currents flow therethrough, whereby a desired voltage can be obtained. In such a structure where the liquid crystal element LC and the light-emitting element EL are switched for display, a bias current continues to flow through the buffer amplifier that does not contribute to display, which might increase power consumption. In contrast, in the case where the liquid crystal element LC and the light-emitting element EL are controlled with one driver circuit, the operation of the entire driver circuit is difficult to stop.

In the structure of one embodiment of the present invention, in the driver circuit for driving the liquid crystal element LC or the light-emitting element EL, a switch is provided between the transistor included in the buffer amplifier and a wiring for supplying a bias voltage to supply a bias current; thus, the buffer amplifier 29_LC and the buffer amplifier 29_EL can be in a stand-by mode independently.

Specifically, in a period during which a grayscale voltage is not output from the buffer amplifier 29_LC, no electrical continuity is established between a gate of the transistor for supplying a bias current in the buffer amplifier 29_LC and the wiring for supplying a bias voltage, and electrical continuity is established between the gate of the transistor and a wiring for supplying a voltage ($V_{DDA}$, GND, or the like). This prevents the bias current from flowing and reduces power consumption.

Similarly, in a period during which a grayscale voltage is not output from the buffer amplifier 29_EL, no electrical continuity is established between a gate of the transistor for supplying a bias current in the buffer amplifier 29_EL and the wiring for supplying a bias voltage, and electrical continuity is established between the gate of the transistor and a wiring for supplying a voltage ($V_{DDA}$, GND, or the like). This prevents the bias current from flowing and reduces power consumption.

The aforementioned switching between the gate of the transistor for supplying a bias current and the wiring for supplying a bias voltage is performed by a switching signal STBY_EL and a switching signal STBY_LC.

In the display device with the structure illustrated in FIGS. 1 and 2, the operation of the buffer amplifier 29_LC for a liquid crystal element and the operation of the buffer amplifier 29_EL for a light-emitting element can be alternately stopped even when the driver circuit for the liquid crystal element LC and the driver circuit for the light-emitting element EL are integrally formed. The bias current stops or restarts flowing in this structure, allowing the stop and the restart to be switched more quickly than that in the structure where the function of the entire driver circuit is stopped.

The display device 10 described above can have improved visibility both in outdoor environments and in indoor environments. Furthermore, in the display device 10 described above, even when the liquid crystal element and the light-emitting element are switched for display with the integrally formed driver circuits for the liquid crystal element and the light-emitting element, the bias current of the buffer amplifier for the liquid crystal element and the bias current of the buffer amplifier for the light-emitting element can be alternately stopped and restarted. This offers a display device with lower power consumption.

<Structure Example of Buffer Amplifier>

A structure example of the aforementioned buffer amplifier, which can control the stop and restart of the bias current, will be described with reference to FIG. 3 and FIGS. 4A to 4D.

FIG. 3 is a circuit diagram of the buffer amplifier 29. The buffer amplifier 29 illustrated in FIG. 3 can be used as the buffer amplifier 29_LC and the buffer amplifier 29_EL in FIG. 2. The switching signal STBY illustrated in FIG. 3 functions as the switching signal STBY_EL or the switching signal STBY_LC. A switching signal STBY_B illustrated in FIG. 3 is an inverted signal of the switching signal STBY illustrated in FIG. 3.

The buffer amplifier 29 illustrated in FIG. 3 includes transistors 41 to 51 and transistors 52 to 62. The transistors 41 to 51 are p-channel transistors. The transistors 52 to 62 are n-channel transistors. A transistor used in the buffer amplifier 29 is preferably a transistor with a high field-effect mobility, particularly a transistor including single crystal silicon in a semiconductor layer.

The buffer amplifier 29 illustrated in FIG. 3 includes a switch 64 between a gate of the transistor 54 and a wiring for supplying a bias voltage VB1. The buffer amplifier 29 illustrated in FIG. 3 includes a switch 63 between a gate of the transistor 41 and a wiring for supplying a bias voltage VB2. The buffer amplifier 29 illustrated in FIG. 3 includes the switch 64 between gates of the transistors 57 and 58 and a wiring for supplying a bias voltage VB3. The buffer amplifier 29 illustrated in FIG. 3 includes the switch 64 between gates of the transistors 55 and 56 and a wiring for supplying a bias voltage VB4. The buffer amplifier 29 illustrated in FIG. 3 includes the switch 63 between gates of the transistors 48 and 49 and a wiring for supplying a bias voltage VB5. The buffer amplifier 29 illustrated in FIG. 3 includes the switch 63 between gates of the transistors 45 and 47 and a wiring for supplying a bias voltage VB6. Furthermore, an input terminal IN and an output terminal OUT are illustrated in the buffer amplifier 29 of FIG. 3.

Figure 4A:
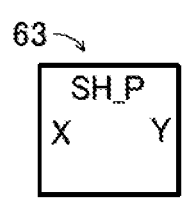
FIGS. 4A to 4D are circuit diagrams illustrating structure examples of a display device.

FIG. 4A is a circuit diagram of the switch 63 illustrated in FIG. 3. In the switch 63 illustrated in FIG. 4A, the switching signals STBY and STBY_B switch the state where electrical continuity is established between a terminal X and a terminal Y and the state where electrical continuity is established between the terminal Y and a wiring for supplying the voltage $V_{DDA}$.

Figure 4B:
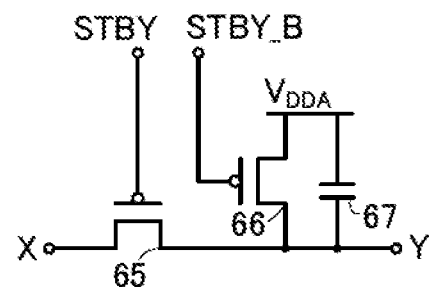

Specifically, the switch 63 illustrated in FIG. 4A can be shown by a circuit diagram of FIG. 4B. The switch 63 illustrated in FIG. 4B includes p-channel transistors 65 and 66 and a capacitor 67.

Figure 4C:
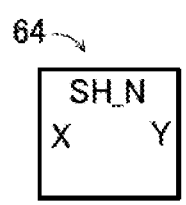

FIG. 4C is a circuit diagram of the switch 64 illustrated in FIG. 3. In the switch 64 illustrated in FIG. 4C, the switching signals STBY and STBY_B switch the state where electrical continuity is established between the terminal X and the terminal Y and the state where electrical continuity is established between the terminal Y and a wiring for supplying a ground voltage.

Figure 4D:
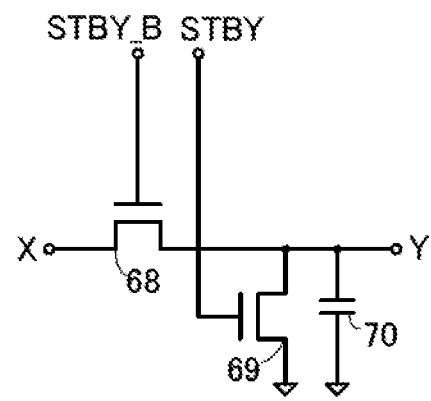

Specifically, the switch 64 illustrated in FIG. 4C can be shown by a circuit diagram of FIG. 4D. The switch 64 illustrated in FIG. 4D includes n-channel transistors 68 and 69 and a capacitor 70.

The buffer amplifier 29 in FIG. 3 is used as the buffer amplifier 29_LC for a liquid crystal element and the buffer amplifier 29_EL for a light-emitting element. The operations of the buffer amplifiers 29_LC and 29_EL can be alternately stopped with use of the switches 63 and 64 illustrated in FIGS. 4A to 4D. The bias current stops or restarts flowing in the structure of FIG. 3, allowing the stop and the restart to be switched more quickly than that in the structure where the function of the entire driver circuit is stopped.

<Operation Mode of Display Device>

An operation mode of the display device will be described with reference to FIGS. 5A to 5E and FIGS. 6A to 6C.

The operation mode of the display device can be switched in accordance with the surrounding illuminance. A block diagram of FIG. 5A illustrates the sensor 90 and the controller 91 shown in FIG. 1.

Figure 5A:
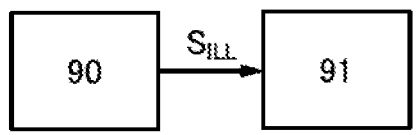
FIGS. 5A to 5E are a block diagram, schematic diagrams, and a state transition diagram illustrating structure examples of a display device.

The sensor 90 in FIG. 5A is configured to, for example, generate a signal $S_{ILL}$ based on illuminance. The controller 91 is configured to switch the display mode with the signal $S_{ILL}$.

Figure 5B:
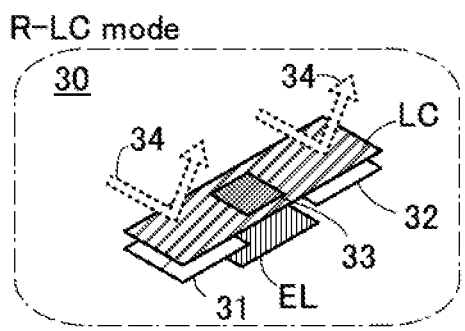
Figure 5C:
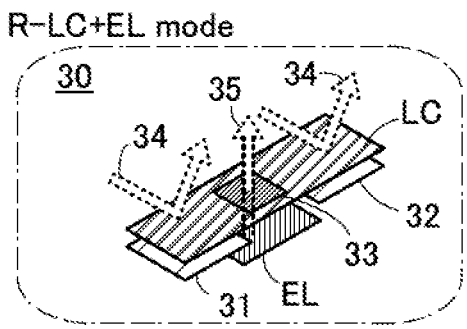
Figure 5D:
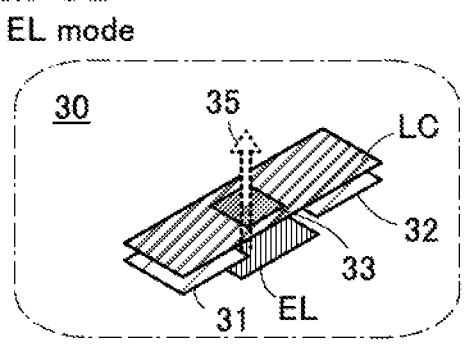

FIGS. 5B to 5D are schematic diagrams of a pixel for describing possible display modes of the display device with different illuminances. Note that FIGS. 5B to 5D illustrate, similarly to FIG. 1, the pixel circuit 31, the pixel circuit 32, the liquid crystal element LC, the light-emitting element EL, the opening 33, the reflected light 34 reflected on the reflective electrode of the liquid crystal element LC, and the light 35 emitted from the light-emitting element EL through the opening 33.

As the possible display modes of the display device, a reflective liquid crystal display mode (R-LC mode), a reflective liquid crystal+EL display mode (R-LC+EL mode), and an EL display mode (EL mode) will be described as illustrated in FIGS. 5B to 5D.

In the reflective liquid crystal display mode, grayscale display is performed by adjusting the intensity of reflected light with the liquid crystal element included in the pixel. Specifically, as shown in the schematic diagram of the pixel in FIG. 5B, the intensity of the reflected light 34 reflected on the reflective electrode of the liquid crystal element LC is adjusted by the liquid crystal layer, whereby grayscale display is performed.

In the reflective liquid crystal+EL display mode (R-LC+EL mode), grayscale display is performed by adjusting both the intensity of reflected light and the intensity of light emitted from the light-emitting element with the liquid crystal element and the light-emitting element. Specifically, as shown in the schematic diagram of the pixel in FIG. 5C, the intensity of the reflected light 34 reflected on the reflective electrode of the liquid crystal element LC and the intensity of the light 35 emitted from the light-emitting element EL through the opening 33 are adjusted to perform grayscale display.

In the EL display mode (EL mode), grayscale display is performed by adjusting the intensity of light with the light-emitting element. Specifically, as shown in the schematic diagram of the pixel in FIG. 5D, the intensity of the light 35 emitted from the light-emitting element EL through the opening 33 is adjusted to perform grayscale display.

Figure 5E:
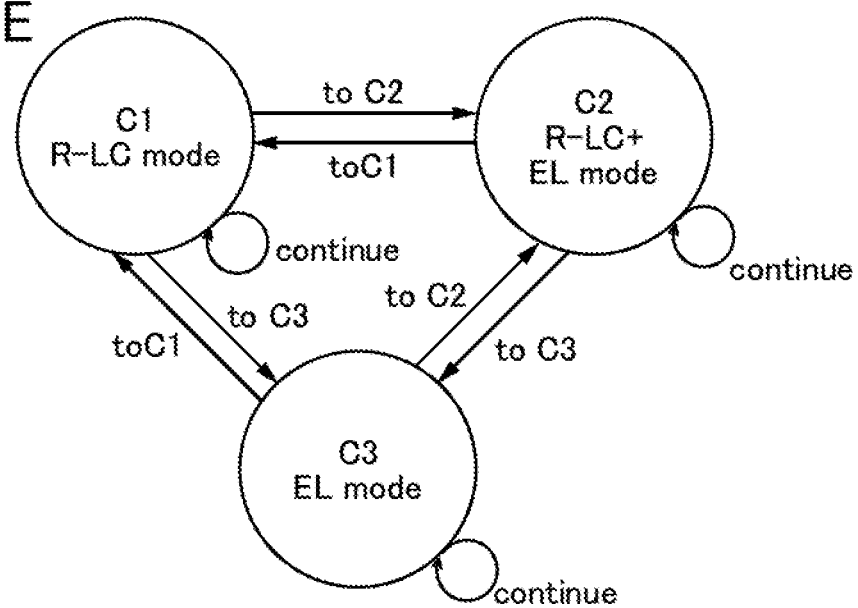

FIG. 5E shows a state transition diagram of the aforementioned three modes (the reflective liquid crystal display mode, the reflective liquid crystal+EL display mode, and the EL display mode). A state C1, a state C2, and a state C3 represent the reflective liquid crystal display mode, the reflective liquid crystal+EL display mode, and the EL display mode, respectively.

As shown in FIG. 5E, any of the display modes can be selected in accordance with illuminance in the states C1 to C3. For example, under a high illuminance such as in outdoor environments, the state can be brought into C1. In the case where the illuminance decreases as from outdoors to indoors, the state C1 transfers to the state C3. In the case where a high illuminance is obtained even indoors so that grayscale display can be performed with reflected light, the state C3 transfers to the state C2.

The above structure of switching the display mode in accordance with illuminance contributes to a reduction in the frequency of grayscale display with the intensity of light emitted from the light-emitting element, which requires a relatively high power consumption. Accordingly, the power consumption of the display device can be reduced.

In the display device, the operation mode can be further switched in accordance with the amount of remaining battery power, the contents to be displayed, or the illuminance of the surrounding environment. A normal driving mode (Normal mode) with a normal frame frequency and an idling stop (IDS) driving mode with a low frame frequency will be described below.

Note that the idling stop (IDS) driving refers to a method in which after image data is written, rewriting of image data is stopped. This increases the interval between writing of image data and subsequent writing of image data, thereby reducing the power that would be consumed by writing of image data in that interval.

The aforementioned normal driving mode and idling stop (IDS) driving will be described with reference to FIGS. 6A to 6C as examples.

Figure 6A:
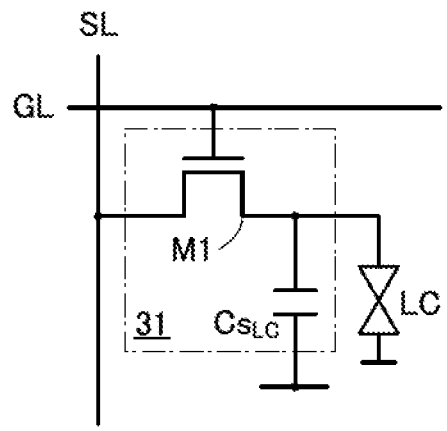
FIGS. 6A to 6C are a circuit diagram and timing charts illustrating structure examples of a display device.

FIG. 6A is a circuit diagram of a pixel including the liquid crystal element LC and the pixel circuit 31. FIG. 6A illustrates a transistor M1 connected to a signal line SL and a gate line GL, a capacitor $C_{SLC}$, and the liquid crystal element LC.

A transistor including an oxide semiconductor in a semiconductor layer (an OS transistor) is preferably used as the transistor M1. The OS transistor has an extremely low leakage current in a non-conduction state (off-state current), so that charge can be retained in a pixel electrode of a liquid crystal element when the OS transistor is turned off.

Figure 6B:
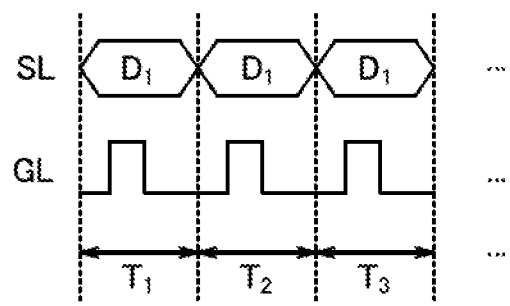

FIG. 6B is a timing chart showing waveforms of signals supplied to the signal line SL and the gate line GL in the normal driving mode. In the normal driving mode, a normal frame frequency (e.g., 60 Hz) is used for operation. In the case where one frame period is divided into periods $T_1$ to $T_3$, a scanning signal is supplied to the gate line in each period and data $D_1$ of the signal line is written to the pixel. This operation is performed both to write the same data $D_1$ in the periods $T_1$ to $T_3$ and to write different data in the periods $T_1$ to $T_3$.

Figure 6C:
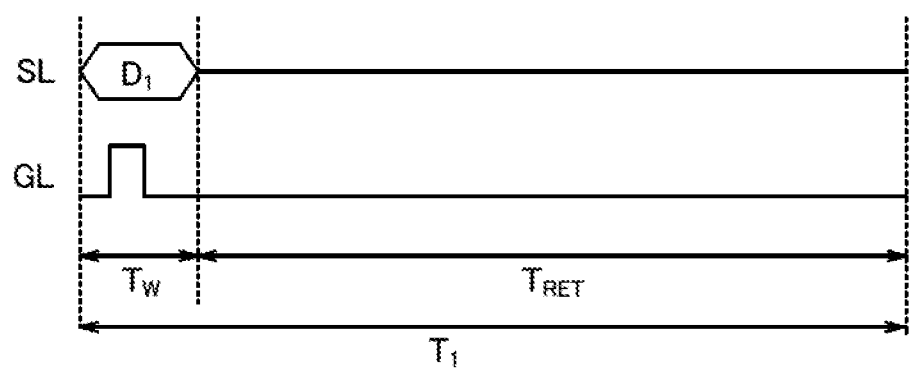

In contrast, FIG. 6C is a timing chart showing waveforms of signals supplied to the signal line SL and the gate line GL in the idling stop (IDS) driving. In the idling stop (IDS) driving, a low frame frequency (e.g., 1 Hz) is used for operation. One frame period is denoted by a period $T_1$ and includes a data writing period $T_W$ and a data retention period $T_{RET}$. In the idling stop (IDS) driving, a scanning signal is supplied to the gate line and the data $D_1$ of the signal line is written to the pixel in the period $T_W$, the gate line is fixed to a low-level voltage in the period $T_{RET}$, and the transistor M1 is turned off so that the written data $D_1$ is retained in the pixel.

The idling stop (IDS) driving mode is effective in combination with the aforementioned reflective liquid crystal display mode or reflective liquid crystal+EL display mode, in which case power consumption can be further reduced.

<Structure Example of Pixel>

A structure example of the pixel will be described with reference to FIG. 7, FIGS. 8A to 8C, and FIGS. 9A and 9B.

Figure 7:
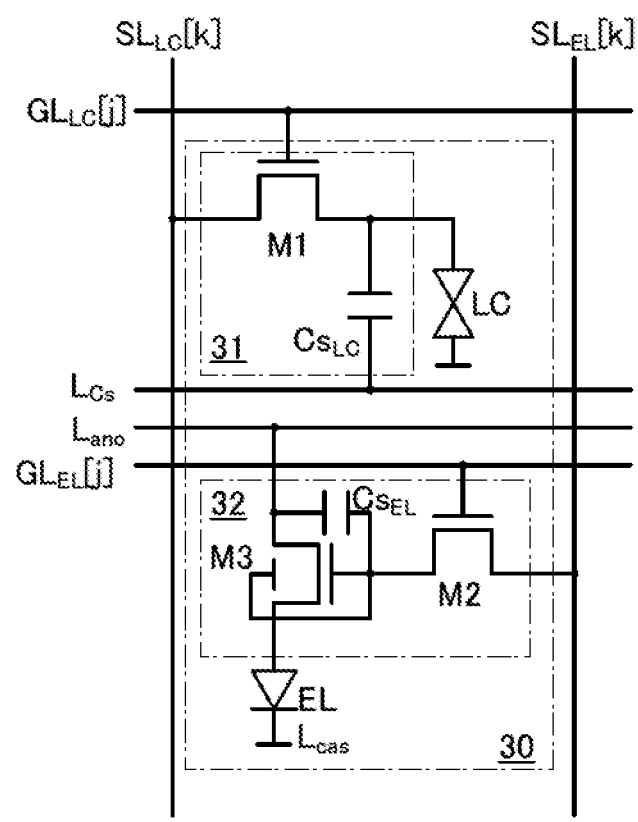
FIG. 7 is a circuit diagram illustrating a structure example of a display device.

The pixel 30 will be described. FIG. 7 illustrates an example of a circuit diagram of the pixel 30. The pixel 30 includes, as described in FIG. 1, the pixel circuit 31, the pixel circuit 32, the liquid crystal element LC, and the light-emitting element EL.

In FIG. 7, the pixel circuit 31 includes the transistor M1 and the capacitor $C_{SLC}$. The pixel circuit 32 includes transistors M2 and M3 and a capacitor $C_{SEL}$. The components in the pixel 30 are connected to a gate line $GL_{LC}[j]$, a gate line $GL_{EL}[j]$, a signal line $SL_{LC}[k]$, a signal line $SL_{EL}[k]$, a capacitor line $L_{CS}$, a current supply line $L_{ano}$, and a common potential line $L_{cas}$ as illustrated in FIG. 7.

Note that the capacitor $C_{SEL}$ is provided in order to retain a grayscale voltage for driving the light-emitting element EL in a gate of the transistor M3. This structure enables more accurate retention of the grayscale voltage for driving the light-emitting element EL.

Note that the transistor M3 includes a back gate, which increases the amount of current flowing through the transistor. A voltage applied to the back gate may be supplied from another wiring, in which case the threshold voltage of the transistor can be controlled.

By controlling the conduction state of the transistor M1, a grayscale voltage for driving the liquid crystal element LC is applied to the capacitor $C_{SLC}$. By controlling the conduction state of the transistor M2, a grayscale voltage for driving the light-emitting element EL is applied to the gate of the transistor M3. The light-emitting element EL is driven when current flows between the current supply line $L_{ano}$ and the common potential line $L_{cas}$ in accordance with the voltage of the gate of the transistor M3.

N-channel transistors can be used as the transistors M1 to M3. The n-channel transistors can be replaced with p-channel transistors by changing the magnitude relationship among voltages of the wirings. Silicon can be used as semiconductor materials of the transistors M1 to M3. As silicon, single crystal silicon, polysilicon, microcrystalline silicon, amorphous silicon, or the like can be used as appropriate.

Alternatively, an oxide semiconductor can be used as the semiconductor materials of the transistors M1 to M3.

The oxide semiconductor used as the semiconductor materials of the transistors M1 to M3 preferably has a cloud aligned composite (CAC)-OS structure.

The CAC-OS has, for example, a composition in which elements included in an oxide semiconductor are unevenly distributed. Materials including unevenly distributed elements each have a size of greater than or equal to 0.5 nm and less than or equal to 10 nm, or greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, or greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0), gallium zinc oxide ($Ga_{X4}Zn_{Y4}O_{Z4}$, where X4, Y4, and Z4 are real numbers greater than 0), or the like, and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to the element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystalline (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

Note that a boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under the conditions where a substrate is not heated intentionally, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor element including a CAC-OS has high reliability. Thus, the CAC-OS is suitably used in a variety of semiconductor devices typified by a display.

For the transistors M1 to M3 included in the pixel 30, various types of transistors such as a bottom-gate transistor and a top-gate transistor can be used.

The transistors M1 to M3 included in the pixel 30 may include back gates. Voltages applied to the back gates may be supplied from a wiring different from the gate line $GL_{LC}[j]$ and the gate line $GL_{EL}[j]$. Only one transistor, for example, the transistor M3 may have a back gate. With such a structure, the threshold voltage of the transistor can be controlled or the amount of current flowing through the transistor can be increased.

The liquid crystal element can be driven by any of the following driving methods: an in-plane-switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like. In addition, the liquid crystal element can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode.

For the liquid crystal element, a liquid crystal material such as thermotropic liquid crystal, low-molecular liquid crystal, high-molecular liquid crystal, polymer dispersed liquid crystal, ferroelectric liquid crystal, or anti-ferroelectric liquid crystal can be used. Alternatively, a liquid crystal material that exhibits a cholesteric phase, a smectic phase, a cubic phase, a chiral nematic phase, an isotropic phase, or the like can be used. Alternatively, a liquid crystal material that exhibits a blue phase can be used.

Note that the light-emitting element can be an EL element such as an organic electroluminescence element or an inorganic electroluminescence element, a light-emitting diode, or the like.

A stack formed to emit white light can be used as the EL element. Specifically, it is possible to use a stack of a layer containing a light-emitting organic compound containing a fluorescent material that emits blue light, and a layer containing a material that is other than a fluorescent material and that emits green light and red light, or a layer containing a material that is other than a fluorescent material and that emits yellow light.

Next, a layout diagram of a pixel which can be used as the pixel 30 is described. A circuit diagram of FIG. 8A is equivalent to the circuit diagram of FIG. 7.

The layout diagram in FIG. 8B corresponds to the arrangement of the components in the circuit diagram in FIG. 8A. FIG. 8B illustrates an electrode $PE_{EL}$ of the light-emitting element EL, the light-emitting element EL, arrangement of the transistors M1 to M3, the gate line $GL_{LC}[j]$, the gate line $GL_{EL}[j]$, the signal line $SL_{LC}[k]$, the signal line $SL_{EL}[k]$, the capacitor line $L_{CS}$, and the current supply line $L_{ano}$.

The layout diagram in FIG. 8C corresponds to the arrangement of the components in the circuit diagram in FIG. 8A. FIG. 8C illustrates a reflective electrode $PE_{LC}$ of the liquid crystal element LC, an opening 33 arranged so as to overlap with the light-emitting element EL, arrangement of the transistors M1 to M3, the gate line $GL_{LC}[j]$, the gate line $GL_{EL}[j]$, the signal line $SL_{LC}[k]$, the signal line $SL_{EL}[k]$, the capacitor line $L_{CS}$, and the current supply line $L_{ano}$.

Although the liquid crystal element LC and the light-emitting element EL are provided separately in the layout diagrams in FIGS. 8B and 8C, they are provided to overlap with each other.

Figure 9A:
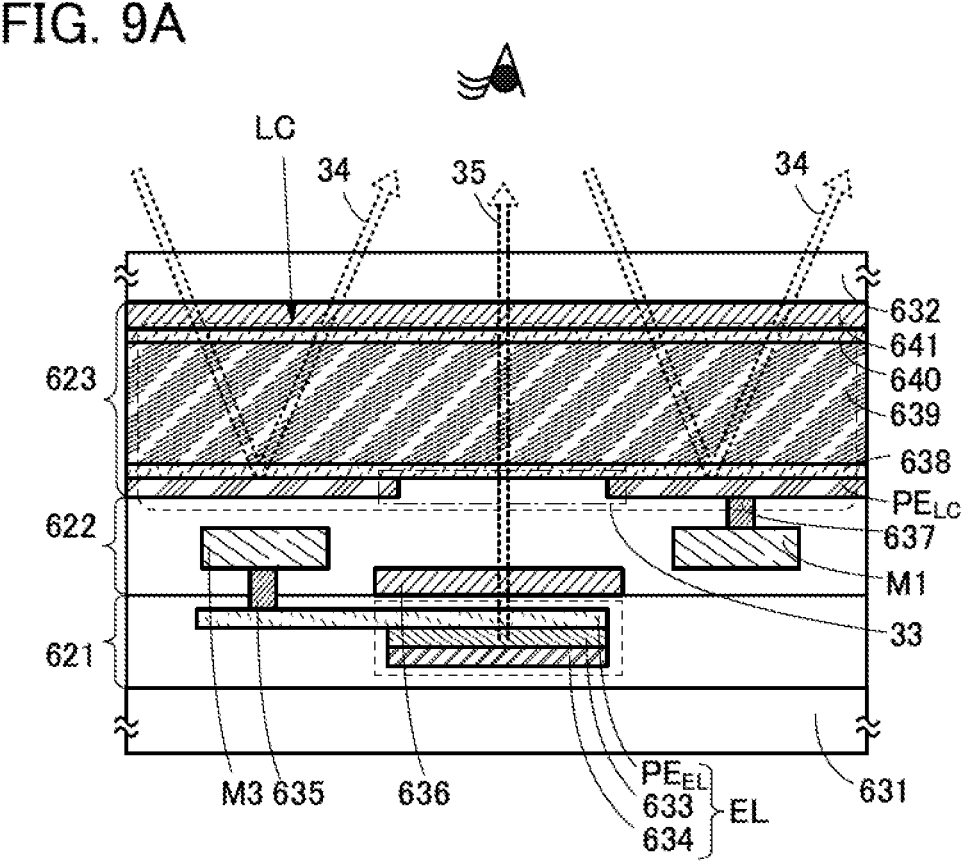
FIGS. 9A and 9B are a schematic cross-sectional view and a perspective view illustrating structure examples of a display device.

FIG. 9A is a schematic cross-sectional view illustrating a stacked structure of the liquid crystal element LC and the light-emitting element EL. FIG. 9A illustrates a layer 621 including the light-emitting element EL, a layer 622 including the transistor, and a layer 623 including the liquid crystal element LC. The layers 621 to 623 are provided between substrates 631 and 632. Although not illustrated, an optical member such as a polarizing plate, a circularly polarizing plate, or an anti-reflective film may be included.

The layer 621 includes the light-emitting element EL. The light-emitting element EL includes the electrode PEEL illustrated in FIG. 8B, a light-emitting layer 633, and an electrode 634. When current flows to the light-emitting layer 633 between the electrode PEEL and the electrode 634, the light 35 (denoted by a dotted arrow) is emitted. The intensity of the light 35 is controlled by the transistor M3 in the layer 622.

The layer 622 includes the transistors M1 and M3, and a color filter 636. The layer 622 further includes a conductive layer 637 for connecting the transistor M1 and the reflective electrode $PE_{LC}$, and a conductive layer 635 for connecting the transistor M3 and the electrode $PE_{EL}$. The color filter 636 is provided when the light-emitting element EL emits white light, and the light 35 with a specific wavelength can be emitted to the viewer side. The color filter 636 is provided so as to overlap with the opening 33. The transistors M1 to M3 (the transistor M2 is not illustrated) are provided so as to overlap with the reflective electrode $PE_{LC}$.

The layer 623 includes the opening 33, the reflective electrode $PE_{LC}$, a conductive layer 638, a liquid crystal 639, a conductive layer 640, and a color filter 641. Orientation of the liquid crystal 639 between a pair of the conductive layer 638 and the conductive layer 640 is controlled by the conductive layer 638. The reflective electrode $PE_{LC}$ reflects the external light and emits the reflected light 34 (denoted by a dotted arrow). The intensity of the reflected light 34 is controlled by adjustment of orientation of the liquid crystal 639 by the transistor M1. The opening 33 is provided in a position that transmits the light 35 emitted from the light-emitting element EL in the layer 621.

A material that reflects visible light can be used for the reflective electrode $PE_{LC}$, for example. Specifically, a material containing silver can be used for the reflective film. For example, a material containing silver, palladium, and the like or a material containing silver, copper, and the like can be used for the reflective film. Alternatively, for example, a material with unevenness on its surface can be used for the reflective film. In that case, incident light can be reflected in various directions so that a white image can be displayed.

A material that transmits visible light can be used for the conductive layers 638 and 640. Specifically, a conductive oxide such as indium oxide, indium tin oxide, indium zinc oxide, zinc oxide, or zinc oxide to which gallium is added, or graphene can be used.

For example, a light-transmitting inorganic material such as glass or ceramics can be used for the substrates 631 and 632. Alternatively, a flexible material, for example, an organic material such as a resin film or plastics can be used for the substrates 631 and 632. Note that members such as a polarizing plate, a retardation plate, and a prism sheet can be stacked on the substrates 631 and 632 as appropriate.

For example, an insulating inorganic material, an insulating organic material, or an insulating composite material containing an inorganic material and an organic material can be used for the insulating layer included in the display device. For the insulating layer, a silicon oxide film, a silicon nitride film, a silicon oxynitride film, an aluminum oxide film, or the like, or a stacked material of any of these films can be used. Alternatively, polyester, polyolefin, polyamide, polyimide, polycarbonate, polysiloxane, an acrylic resin, or the like, or a stacked material or a composite material of a plurality of resins selected from these materials can be used.

The conductive layers 635 and 637 included in the display device can be formed using a conductive material and can be used for wirings or the like. For example, a metal element selected from aluminum, gold, platinum, silver, copper, chromium, tantalum, titanium, molybdenum, tungsten, nickel, iron, cobalt, palladium, and manganese can be used. Alternatively, an alloy containing any of the above-described metal elements, or the like can be used for the wiring or the like.

The light-emitting layer 633 included in the display device is formed by freely combining an EL layer, a charge-transport layer, and a charge-injection layer. For example, a low-molecular organic EL material or a high-molecular organic EL material is used. As the EL layer, a thin film made of a light-emitting material that emits light (fluorescence) by singlet excitation (a singlet compound) or a thin film made of a light-emitting material that emits light (phosphorescence) by triplet excitation (a triplet compound) can be used. In addition, an inorganic material such as silicon carbide can also be used as the charge-transport layer and the charge-injection layer. As the organic EL material and inorganic material, known materials can be used.

The electrode PEEL included in the display device functions as an anode of the light-emitting element EL. A material for forming the anode has a work function higher than that of a material for forming a cathode. For example, indium oxide tin oxide (ITO), indium oxide zinc oxide ($In_2O_3$—ZnO), or zinc oxide (ZnO), or a material having lower sheet resistance than ITO, such as platinum (Pt), chromium (Cr), tungsten (W), or nickel (Ni) can be used.

The electrode 634 included in the display device can be formed using a metal having a low work function (typically, a metal element which belongs to Group 1 or Group 2 of the periodic table), or an alloy thereof. The luminous efficiency increases as the work function is lower; thus, in particular, an alloy material containing lithium (Li), which is an alkali metal, is preferably used as a material for the cathode.

Figure 9B:
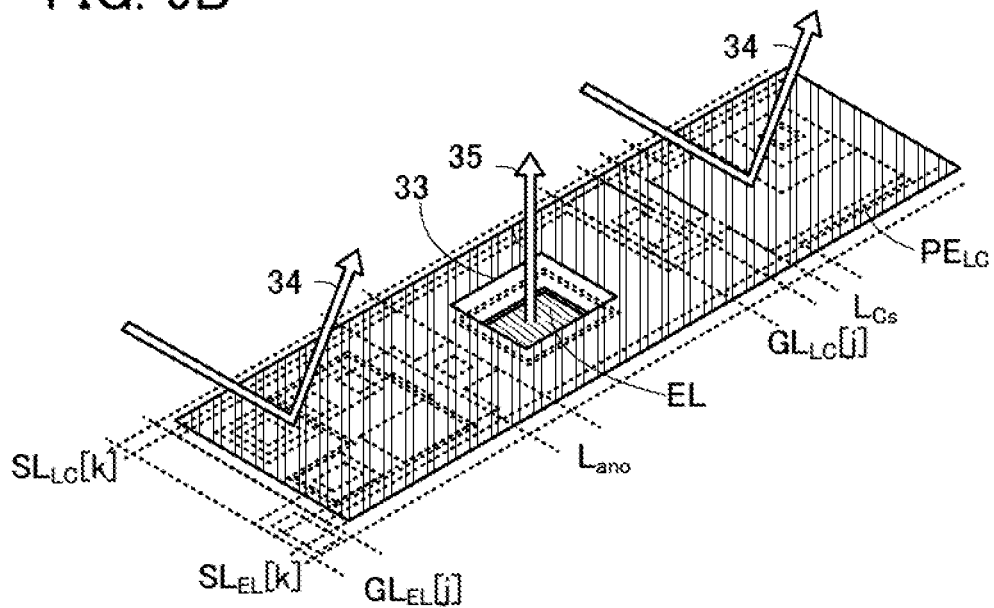

FIG. 9B is a perspective view in which the layout diagrams in FIGS. 8B and 8C overlap with each other for illustrating the stacked structure of the liquid crystal element LC and the light-emitting element EL. As illustrated in FIG. 9B, the liquid crystal element LC and the light-emitting element EL are provided to overlap with each other. Then, the opening 33 is provided in a position that transmits the light 35 emitted from the light-emitting element EL. With such a structure, switching of display elements in accordance with the surrounding environment can be achieved without increasing the area occupied by the pixel. Consequently, a display device with improved visibility can be obtained.

<Cross-Sectional Structure Example>

Cross-sectional structure examples of the pixel and other portions are described with reference to FIG. 10 and FIGS. 11A to 11C.

Figure 10:
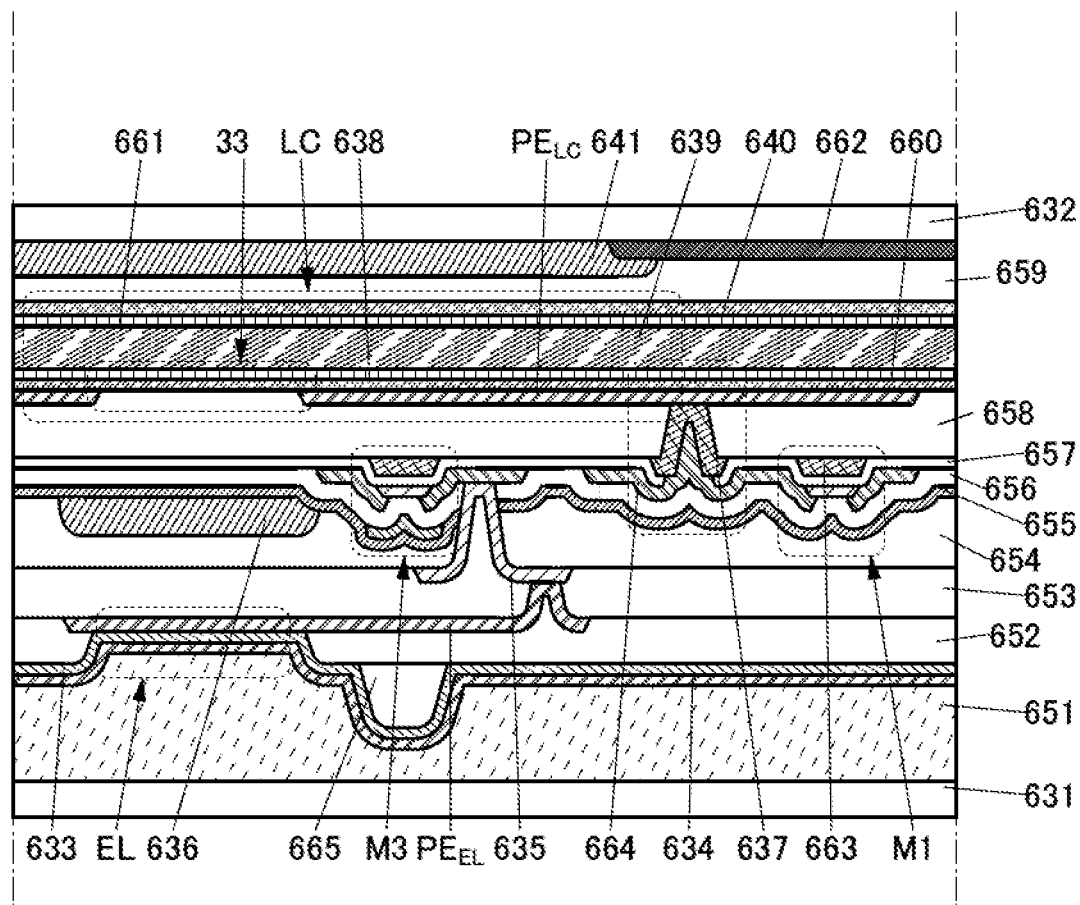
FIG. 10 is a schematic cross-sectional view illustrating a structure example of a display device.

FIG. 10 shows a detailed schematic cross-sectional view of the pixel in FIG. 9A. In FIG. 10, the same components as in FIG. 9A are denoted by the same reference numerals and the description thereof is not repeated.

In the schematic cross-sectional view of the pixel of the display device in FIG. 10, in addition to the components in FIG. 9A, an adhesive layer 651, an insulating layer 652, an insulating layer 653, an insulating layer 654, an insulating layer 655, an insulating layer 656, an insulating layer 657, an insulating layer 658, an insulating layer 659, an alignment film 660, an alignment film 661, a light-blocking film 662, a conductive layer 663, a conductive layer 664, and an insulating layer 665 are provided between the substrates 631 and 632.

The insulating layer 652, the insulating layer 653, the insulating layer 654, the insulating layer 655, the insulating layer 656, the insulating layer 657, the insulating layer 658, the insulating layer 659, and the insulating layer 665 can be formed using an insulating inorganic material, an insulating organic material, or an insulating composite material containing an inorganic material and an organic material. For the insulating layer, a silicon oxide film, a silicon nitride film, a silicon oxynitride film, an aluminum oxide film, or the like, or a stacked material of any of these films can be used. Alternatively, polyester, polyolefin, polyamide, polyimide, polycarbonate, polysiloxane, an acrylic resin, or the like, or a stacked material or a composite material of a plurality of resins selected from these materials can be used.

The conductive layers 663 and 664 can be formed using a conductive material and can be used for wirings or the like. For example, a metal element selected from aluminum, gold, platinum, silver, copper, chromium, tantalum, titanium, molybdenum, tungsten, nickel, iron, cobalt, palladium, and manganese can be used for the conductive layer. Alternatively, an alloy containing any of the above-described metal elements, or the like can be used for the wiring or the like.

As the adhesive layer 651, a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component type resin may be used. Still alternatively, an adhesive sheet or the like may be used.

For the alignment film 660 and the alignment film 661, an organic resin such as polyimide can be used. In the case where optical alignment treatment for aligning the liquid crystal 639 in a predetermined direction is performed, the alignment film 660 and the alignment film 661 may be omitted. Also in the case of using a liquid crystal which does not need alignment treatment, the alignment film 660 and the alignment film 661 may be omitted.

The light-blocking film 662 can be formed using a light-blocking material which absorbs light, such as chromium, chromium oxide, or a black resin.

Figure 11A:
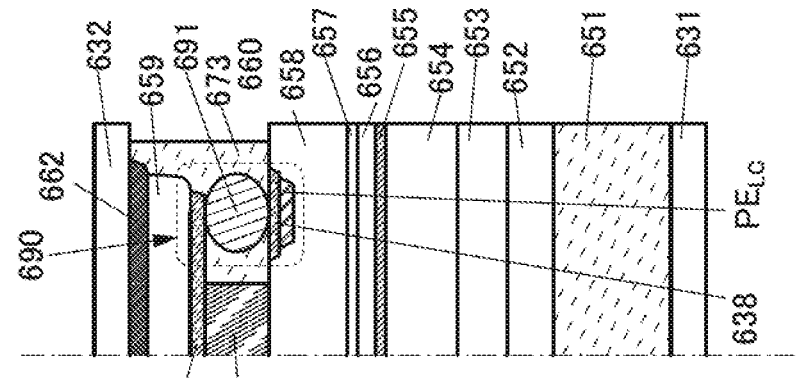
FIGS. 11A to 11C are schematic cross-sectional views illustrating structure examples of a display device.
Figure 11B:
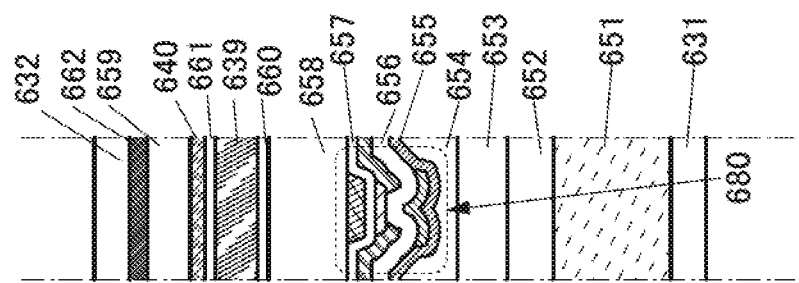
Figure 11C:
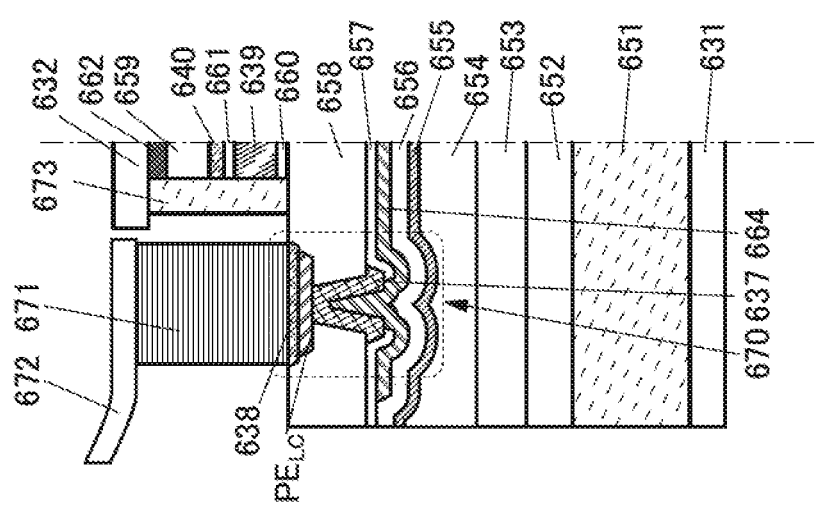

FIGS. 11A to 11C show schematic cross-sectional views of a terminal portion, a driver circuit portion, and a common contact portion which correspond to the schematic cross-sectional view of the pixel of the display device in FIG. 10. In FIGS. 11A to 11C, the same components as in FIG. 9A and FIG. 10 are denoted by the same reference numerals and the description thereof is not repeated.

FIG. 11A is the schematic cross-sectional view of the terminal portion of the display device. In a connection portion 670 for connection to an external circuit in the terminal portion, the conductive layer 637, the conductive layer 664, the reflective electrode Pac, and the conductive layer 638 are stacked. A flexible printed circuit (FPC) 672 is connected to the connection portion 670 through a connection layer 671. An adhesive layer 673 is provided at an end portion of the substrate 632, thereby attaching the substrate 632 to the substrate 631.

FIG. 11B is the schematic cross-sectional view of the driver circuit portion of the display device. A transistor 680 in the driver circuit portion can have the same structure as the transistor M3.

FIG. 11C is the schematic cross-sectional view of the common contact portion of the display device. At a connection portion 690 in the common contact portion, the conductive layer 640 on the substrate 632 side is connected to the conductive layer 638 and the reflective electrode Pac on the substrate 631 side through a connector 691 in the adhesive layer 673.

<Display Module>

A display module including a display device of one embodiment of the present invention is described with reference to FIG. 12. The display module including the display device of one embodiment of the present invention can reduce power consumption or improve visibility or convenience.

Figure 12:
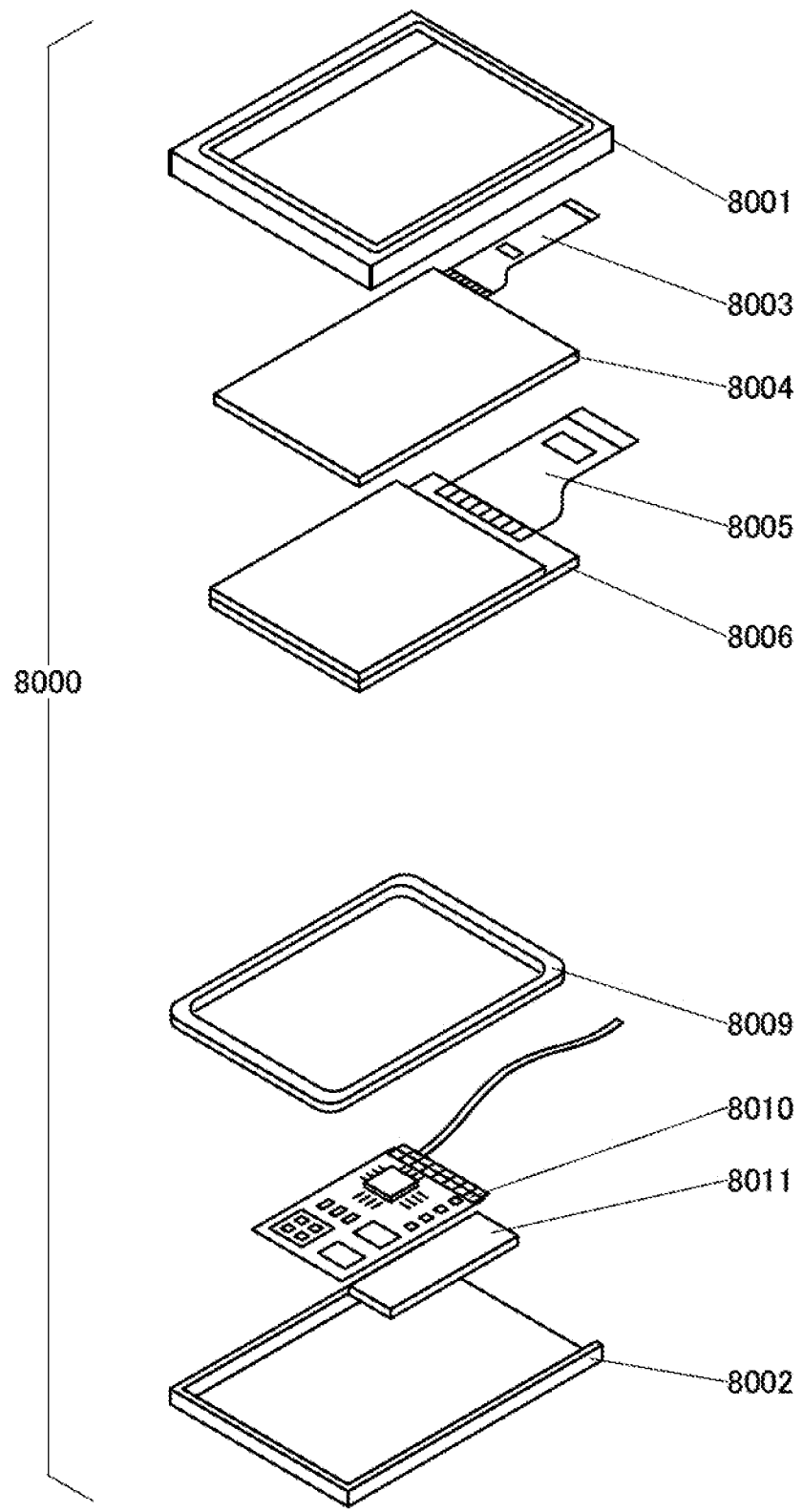
FIG. 12 illustrates a display module.

In a display module 8000 illustrated in FIG. 12, a touch panel 8004 connected to an FPC 8003, a display panel 8006 connected to an FPC 8005, a frame 8009, a printed circuit board 8010, and a battery 8011 are provided between an upper cover 8001 and a lower cover 8002.

The display device of one embodiment of the present invention can be used for, for example, the display panel 8006. Thus, excellent visibility can be maintained outdoors or indoors.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and can be formed to overlap with the display panel 8006. A counter substrate (sealing substrate) of the display panel 8006 can have a touch panel function. A photosensor can be provided in each pixel of the display panel 8006 to form an optical touch panel.

The frame 8009 protects the display panel 8006 and also functions as an electromagnetic shield for blocking electromagnetic waves generated by the operation of the printed circuit board 8010. The frame 8009 may function as a radiator plate.

The printed circuit board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

<Electronic Appliance>

FIGS. 13A to 13G illustrate electronic appliances. These electronic appliances can include a housing 9000, a display portion 9001, a speaker 9003, operation keys 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 9008, and the like. The display portion 9001 includes the display module of one embodiment of the present invention, leading to a reduction in power consumption or an improvement in visibility or convenience.

The electronic appliances illustrated in FIGS. 13A to 13G can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Note that functions that can be provided for the electronic appliances illustrated in FIGS. 13A to 13G are not limited to those described above, and the electronic appliances can have a variety of functions. Although not illustrated in FIGS. 13A to 13G, the electronic appliance may include a plurality of display portions. Furthermore, the electronic appliance may be provided with a camera and the like and have a function of shooting a still image, a function of shooting a moving image, a function of storing a shot image in a memory medium (an external memory medium or a memory medium incorporated in the camera), a function of displaying a shot image on the display portion, or the like.

The electronic appliances illustrated in FIGS. 13A to 13G are described in detail below.

Figure 13A:
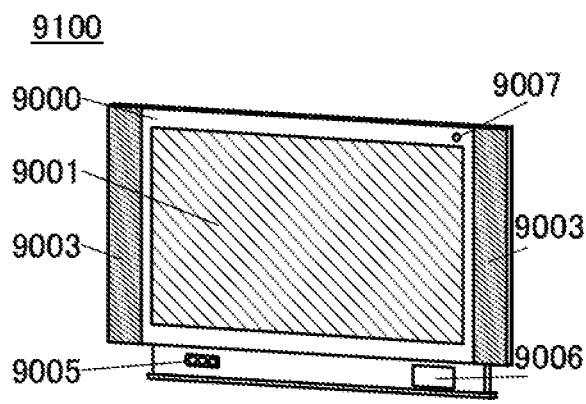
FIGS. 13A to 13G illustrate electronic devices.

FIG. 13A is a perspective view illustrating a television device 9100. The television device 9100 can include the display portion 9001 having a large screen size of, for example, 50 inches or more, or 100 inches or more.

Figure 13D:
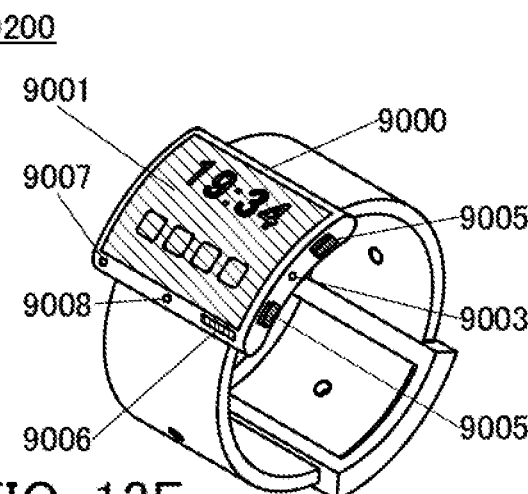
Figure 13B:
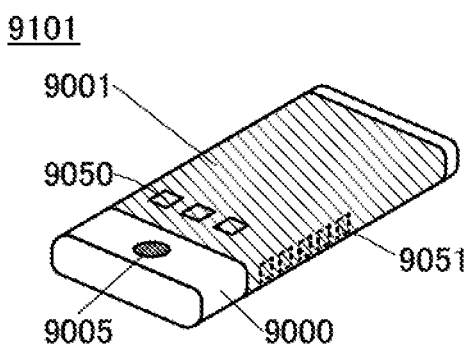

FIG. 13B is a perspective view illustrating a portable information terminal 9101. The portable information terminal 9101 functions as, for example, one or more of a telephone set, a notebook, and an information browsing system. Specifically, the portable information terminal 9101 can be used as a smartphone. Note that the portable information terminal 9101 may include a speaker, a connection terminal, a sensor, and the like. The portable information terminal 9101 can display characters and image information on its plurality of surfaces. For example, three operation buttons 9050 (also referred to as operation icons or simply icons) can be displayed on one surface of the display portion 9001. Furthermore, information 9051 indicated by dashed rectangles can be displayed on another surface of the display portion 9001. Examples of the information 9051 include display indicating reception of an incoming email, social networking service (SNS) message, and call; the title and sender of an email and SNS massage; the date; the time; remaining battery; and the reception strength of an antenna. Alternatively, the operation buttons 9050 or the like may be displayed in place of the information 9051.

Figure 13E:
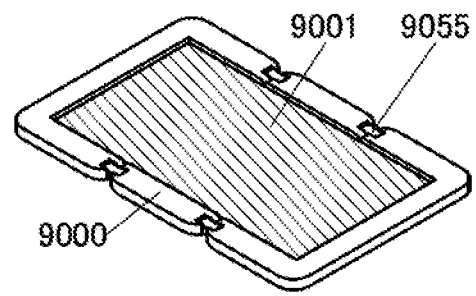
Figure 13C:
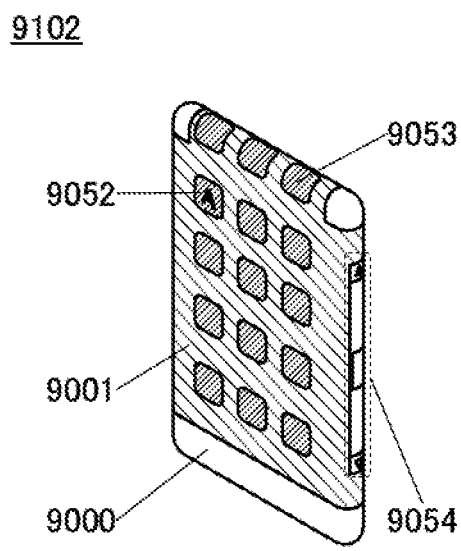

FIG. 13C is a perspective view illustrating a portable information terminal 9102. The portable information terminal 9102 has a function of displaying information, for example, on three or more surfaces of the display portion 9001. Here, information 9052, information 9053, and information 9054 are displayed on different surfaces. For example, a user of the portable information terminal 9102 can see the display (here, the information 9053) with the portable information terminal 9102 put in a breast pocket of his/her clothes. Specifically, a caller's phone number, name, or the like of an incoming call is displayed in a position that can be seen from above the portable information terminal 9102. Thus, the user can see the display without taking out the portable information terminal 9102 from the pocket and decide whether to answer the call.

FIG. 13D is a perspective view illustrating a wrist-watch-type portable information terminal 9200. The portable information terminal 9200 is capable of executing a variety of applications such as mobile phone calls, e-mailing, reading and editing texts, music reproduction, Internet communication, and a computer game. The display surface of the display portion 9001 is bent, and images can be displayed on the bent display surface. The portable information terminal 9200 can employ near field communication that is a communication method based on an existing communication standard. In that case, for example, mutual communication between the portable information terminal 9200 and a headset capable of wireless communication can be performed, and thus hands-free calling is possible. Moreover, the portable information terminal 9200 includes the connection terminal 9006, and data can be directly transmitted to and received from another information terminal via a connector. Charging through the connection terminal 9006 is also possible. Note that the charging operation may be performed by wireless power feeding without using the connection terminal 9006.

Figure 13F:
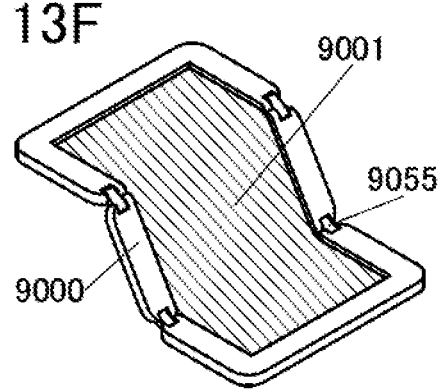
Figure 13G:
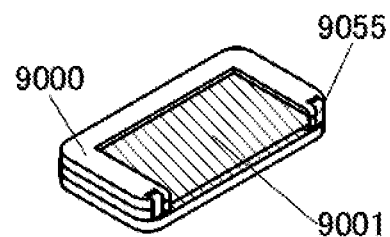

FIGS. 13E, 13F, and 13G are perspective views of a foldable portable information terminal 9201. FIG. 13E is a perspective view illustrating the portable information terminal 9201 that is opened. FIG. 13F is a perspective view illustrating the portable information terminal 9201 that is being opened or being folded. FIG. 13G is a perspective view illustrating the portable information terminal 9201 that is folded. The portable information terminal 9201 is highly portable when folded. When the portable information terminal 9201 is opened, a seamless large display region is highly browsable. The display portion 9001 of the portable information terminal 9201 is supported by three housings 9000 joined together by hinges 9055. By folding the portable information terminal 9201 at a connection portion between two housings 9000 with the hinges 9055, the portable information terminal 9201 can be reversibly changed in shape from an opened state to a folded state. For example, the portable information terminal 9201 can be bent with a radius of curvature of greater than or equal to 1 mm and less than or equal to 150 mm.

<Notes on Description of this Specification and the Like>

In this specification and the like, ordinal numbers such as "first", "second", and "third" are used in order to avoid confusion among components. Thus, the terms do not limit the number or order of components.

In a block diagram in this specification and the like, components are functionally classified and shown by blocks that are independent of each other. However, in an actual circuit and the like, such components are sometimes hard to classify functionally, and there is a case where one circuit is associated with a plurality of functions or a case where a plurality of circuits are associated with one function. Therefore, the segmentation of blocks in a block diagram is not limited by any of the components described in the specification and can be differently determined as appropriate depending on the situation.

The same elements or elements having similar functions, elements formed using the same material, elements formed at the same time, or the like in the drawings are denoted by the same reference numerals, and the description thereof is not repeated in some cases.

In this specification and the like, the terms "one of a source and a drain" (or first electrode or first terminal) and "the other of the source and the drain" (or second electrode or second terminal) are used to describe the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, "voltage" and "potential" can be replaced with each other. The voltage refers to a potential difference from a reference potential. When the reference potential is a ground potential, for example, "voltage" can be replaced with "potential". The ground potential does not necessarily mean 0 V. Potentials are relative values, and a potential supplied to a wiring or the like is sometimes changed depending on the reference potential.

In this specification and the like, a switch is in a conductive state (on state) or in a non-conductive state (off state) to determine whether current flows therethrough or not. Alternatively, a switch has a function of selecting and changing a current path.

Examples of the switch are an electrical switch and a mechanical switch. That is, any element can be used as a switch as long as it can control current, without limitation to a certain element.

In the case of using a transistor as a switch, an "on state" of the transistor refers to a state in which a source and a drain of the transistor are electrically short-circuited. Furthermore, an "off state" of the transistor refers to a state in which the source and the drain of the transistor are electrically disconnected. In the case where a transistor operates just as a switch, the polarity (conductivity type) of the transistor is not particularly limited to a certain type.

In this specification and the like, the expression "A and B are connected" or "A is connected to B" means the case where A and B are electrically connected to each other as well as the case where A and B are directly connected to each other. Here, the expression "A and B are electrically connected" means the case where electric signals can be transmitted and received between A and B when an object having any electric action exists between A and B.

This application is based on Japanese Patent Application serial No. 2016-119200 filed with Japan Patent Office on Jun. 15, 2016, the entire contents of which are hereby incorporated by reference.

REFERENCE NUMERALS

10: display device 11: pixel portion 12: driver circuit 13: driver circuit 14: driver circuit 21: shift register 22: latch 23: level shifter 24: D/A converter 25: buffer amplifier 30: pixel 90: sensor 91: controller 92: power source circuit 93: switching control circuit 26_LC: level shifter 26_EL: level shifter 27_LC: voltage generation circuit 27_EL: voltage generation circuit 28_LC: pass transistor logic 28_EL: pass transistor logic 29_LC: buffer amplifier 29_EL: buffer amplifier 29: buffer amplifier 41 to 51: transistors 52 to 62: transistors 63: switch 64: switch 65: transistor 66: transistor 67: capacitor 68: transistor 69: transistor 70: capacitor 31: pixel circuit 32: pixel circuit LC: liquid crystal element EL: light-emitting element 33: opening 34: reflected light 35: light M1: transistor $C_{SLC}$: capacitor 621: layer 622: layer 623: layer 631: substrate 632: substrate 633: light-emitting layer 634: electrode 635: conductive layer 636: color filter 637: conductive layer 638: conductive layer 639: liquid crystal 640: conductive layer 641: color filter 651: adhesive layer 652: insulating layer 653: insulating layer 654: insulating layer 655: insulating layer 656: insulating layer 657: insulating layer 658: insulating layer 659: insulating layer 660: alignment film 661: alignment film 662: light-blocking film 663: conductive layer 664: conductive layer 665: insulating layer 670: connection portion 671: connection portion 672: FPC 673: adhesive layer 680: transistor 690: connection portion 691: connector 8000: display module 8001: upper cover 8002: lower cover 8003: FPC 8004: touch panel 8005: FPC 8006: display panel 8009: frame 8010: printed board 8011: battery 9000: housing 9001: display portion 9003: speaker 9005: operation key 9006: connection terminal 9007: sensor 9008: microphone 9050: operation button 9051: information 9052: information 9053: information 9054: information 9055: hinge 9100: television device 9101: portable information terminal 9102: portable information terminal 9200: portable information terminal 9201: portable information terminal

The invention claimed is:

1. A display device comprising:
a pixel comprising:
a liquid crystal element which comprises a reflective electrode comprising an opening; and
a light-emitting element which is below and overlaps with the opening and is configured to emit light through the opening; and
a source driver circuit comprising:
a first buffer amplifier for the liquid crystal element; and
a second buffer amplifier for the light-emitting element,
wherein each of the first buffer amplifier and the second buffer amplifier comprises a first transistor and a switch electrically connected to a gate of the first transistor,
wherein the switch is configured to alternately switch driving and stopping of the first buffer amplifier and the second buffer amplifier,
wherein an operation of the first buffer amplifier is stopped while the second buffer amplifier is driven, and
wherein an operation of the second buffer amplifier is stopped while the first buffer amplifier is driven.

2. The display device according to claim 1, further comprising a switching control circuit configured to output a first switching signal to the first buffer amplifier and a second switching signal to the second buffer amplifier.

3. The display device according to claim 1, further comprising a controller and a sensor,
wherein the sensor is configured to measure illuminance, and
wherein, in accordance with the illuminance measured by the sensor, the controller is configured to switch a first mode for performing display with the liquid crystal element, a second mode for performing display with the liquid crystal element and the light-emitting element, and a third mode for performing display with the light-emitting element.

4. The display device according to claim 1, wherein the source driver circuit further comprises a first level shifter operationally connected to the first buffer amplifier and a second level shifter operationally connected to the second buffer amplifier.

5. A display module comprising:
the display device according to claim 1; and
a touch panel.

6. An electronic device comprising:
the display device according to claim 1; and
at least one of an operation key and a battery.

7. The display device according to claim, 1, further comprising:
a first wiring electrically connected to the first buffer amplifier; and
a second wiring electrically connected to the second buffer amplifier, and
wherein the first wiring is configured to supply a first signal switching a supply of a bias voltage, and
wherein the second wiring is configured to supply a second signal switching a supply of a bias voltage.

8. A display device comprising:
a pixel comprising:
   a liquid crystal element which comprises a reflective electrode comprising an opening;
   a first pixel circuit configured to drive the liquid crystal element;
   a light-emitting element which is below and overlaps with the opening and is configured to emit light through the opening; and
   a second pixel circuit configured to drive the light-emitting element; and
a source driver circuit comprising:
   a first buffer amplifier for the liquid crystal element; and
   a second buffer amplifier for the light-emitting element,
wherein each of the first buffer amplifier and the second buffer amplifier comprises a first transistor and a switch electrically connected to a gate of the first transistor,
wherein the switch is configured to alternately switch driving and stopping of the first buffer amplifier and the second buffer amplifier,
wherein an operation of the first buffer amplifier is stopped while the second buffer amplifier is driven,
wherein an operation of the second buffer amplifier is stopped while the first buffer amplifier is driven, and
wherein each of the first pixel circuit and the second pixel circuit comprises a second transistor comprising an oxide semiconductor layer.

9. The display device according to claim 8, further comprising a switching control circuit configured to output a first switching signal to the first buffer amplifier and a second switching signal to the second buffer amplifier.

10. The display device according to claim 8, further comprising a controller and a sensor,
   wherein the sensor is configured to measure illuminance, and
   wherein, in accordance with the illuminance measured by the sensor, the controller is configured to switch a first mode for performing display with the liquid crystal element, a second mode for performing display with the liquid crystal element and the light-emitting element, and a third mode for performing display with the light-emitting element.

11. The display device according to claim 8, wherein the source driver circuit further comprises a first level shifter operationally connected to the first buffer amplifier and a second level shifter operationally connected to the second buffer amplifier.

12. A display module comprising:
the display device according to claim 8; and
a touch panel.

13. An electronic device comprising:
the display device according to claim 8; and
at least one of an operation key and a battery.

14. A display device comprising:
a pixel comprising:
   a liquid crystal element which comprises a reflective electrode comprising an opening and is configured to display a grayscale image by reflecting external light;
   a first pixel circuit configured to drive the liquid crystal element;
   a light-emitting element which is below and overlaps with the opening and is configured to display a grayscale image by emitting light through the opening; and
   a second pixel circuit configured to drive the light-emitting element;
a source driver circuit comprising:
   a first buffer amplifier configured to output a grayscale voltage to the liquid crystal element; and
   a second buffer amplifier configured to output a grayscale voltage to the light-emitting element; and
a switching control circuit,
wherein each of the first buffer amplifier and the second buffer amplifier comprises a first transistor configured to supply a bias current, and a switch between a wiring for supplying a bias voltage and a gate of the first transistor,
wherein the switch is configured to alternately switch driving and stopping of the first buffer amplifier and the second buffer amplifier,
wherein an operation of the first buffer amplifier is stopped while the second buffer amplifier is driven,
wherein an operation of the second buffer amplifier is stopped while the first buffer amplifier is driven, and
wherein the switching control circuit is configured to output a switching signal for controlling a conduction state of the switch.

15. The display device according to claim 14, wherein the switching signal comprises a first switching signal to be supplied to the first buffer amplifier and a second switching signal to be supplied to the second buffer amplifier.

16. The display device according to claim 14, further comprising a controller and a sensor,
   wherein the sensor is configured to measure illuminance, and
   wherein, in accordance with the illuminance measured by the sensor, the controller is configured to switch a first mode for performing display with the liquid crystal element, a second mode for performing display with the liquid crystal element and the light-emitting element, and a third mode for performing display with the light-emitting element.

17. The display device according to claim 14, wherein the source driver circuit further comprises a first level shifter operationally connected to the first buffer amplifier and a second level shifter operationally connected to the second buffer amplifier.

18. A display module comprising:
the display device according to claim 14; and
a touch panel.

19. An electronic device comprising:
the display device according to claim 14; and
at least one of an operation key and a battery.

* * * * *